(12) United States Patent
Endo et al.

(10) Patent No.: US 7,088,304 B2
(45) Date of Patent: Aug. 8, 2006

(54) ANTENNA COIL, AND RFID-USE TAG USING IT, TRANSPONDER-USE ANTENNA

(75) Inventors: Takanori Endo, Saitama (JP); Seirou Yahata, Funabashi (JP); Takashi Tsuchida, Okegawa (JP); Tadashi Yonezawa, Saitama (JP)

(73) Assignee: Mitsubishi Materials Corporation, Tokyo (JP)

( * ) Notice: Subject to any disclaimer, the term of this patent is extended or adjusted under 35 U.S.C. 154(b) by 0 days.

(21) Appl. No.: 10/490,704

(22) PCT Filed: Sep. 26, 2002

(86) PCT No.: PCT/JP02/09955

§ 371 (c)(1),
(2), (4) Date: Aug. 23, 2004

(87) PCT Pub. No.: WO03/030300

PCT Pub. Date: Apr. 10, 2003

(65) Prior Publication Data

US 2005/0007296 A1 Jan. 13, 2005

(30) Foreign Application Priority Data

Sep. 28, 2001 (JP) .............................. 2001-303050
Dec. 3, 2001 (JP) .............................. 2001-368241

(51) Int. Cl.
*H01Q 7/08* (2006.01)
(52) U.S. Cl. ....................................... 343/788; 343/895
(58) Field of Classification Search ......... 343/700 MS, 343/895, 788, 866, 741, 787
See application file for complete search history.

(56) References Cited

FOREIGN PATENT DOCUMENTS

| EP | 762 535 | 3/1997 |
|---|---|---|
| EP | 886 232 | 12/1998 |
| JP | 63-115403 | 5/1988 |
| JP | 3-64105 | 3/1991 |
| JP | 3-71698 | 3/1991 |
| JP | 8-31237 | 2/1996 |
| JP | 09-284038 | 10/1997 |
| JP | 9-284038 | 10/1997 |
| JP | 11-98061 | 4/1999 |
| JP | 2001-028510 | 1/2001 |
| JP | 2001-28510 | 1/2001 |
| JP | 2002-324221 | 11/2002 |
| JP | 2002-325013 | 11/2002 |
| JP | 2002-344226 | 11/2002 |

*Primary Examiner*—Hoang V. Nguyen
(74) *Attorney, Agent, or Firm*—Oblon, Spivak, McClelland, Maier & Neustadt, P.C.

(57) ABSTRACT

An antenna coil includes an air-core coil wound helically in a plane and a plate magnetic core member inserted in the air-core coil to be approximately parallel with a plane of the air-core coil. The magnetic core member is formed by a soft magnetic metal, an amorphous or ferrite, or a composite member of a powder, flake and plastic, or rubber. The magnetic core member is formed by performing an injection molding operation or a compressing molding operation of the composite member. Alternatively, the magnetic core member is a magnetic coating formed by applying and drying the composite member. A non-magnetic conductive plate that has a conductivity is layered on a surface of the air-core coil through which the magnetic core member is inserted. The conductive plate is made of a copper, a copper alloy, an aluminum or an aluminum alloy having 0.01 to 2 mm thickness. The antenna coil is operated by relatively high frequency while it is rigid relatively.

34 Claims, 13 Drawing Sheets

ANTENNA COIL, AND RFID-USE TAG USING IT, TRANSPONDER-USE ANTENNA

This application is a 371 of PCT/JP02/09955 filed Sep. 26, 2002.

1. Technical Field

The present invention relates to an antenna coil which is used for an identification tag in which an RFID (Radio Frequency Identification) technology or an EAS (Electronic Article Surveillance) technology is used.

Also, the present invention relates to an antenna which is used for a transponder such as a tag or a reader/writer in which the EAS technology is used.

More specifically, the present invention relates to a transponder antenna which is provided with a helix coil so as to be attached to an article.

2. Background Art

Conventionally, for a tag in which the RFID technology or the EAS technology is used, an identification tag is known to which an IC chip in which an information is stored and a condenser for resonation are connected to an antenna coil electrically. In such an identification tag, it has been know that the tag is activated by transmitting a radio wave having a predetermined frequency from a transmitting/receiving antenna in an interrogator to the antenna coil. Also, an article is identified or monitored by reading the stored information in the IC chip according to a read-out command in a data communication by a radio wave or by detecting a resonation for a radio wave having a specific frequency.

For a conventional antenna coil which is used for such an identification tag, it has been known that a lead wire is wound helically around a center of an axial line of a magnetic core member which is formed in a shaft manner. In a case in which an article to be controlled is a metal member, such a tag in which an antenna coil is used is fixed on the article such that an electrically insulating spacer having 5 to 10 mm thickness is inserted between the antenna coil and the article so as to avoid undesirable influence by the metal article. However, in the above conventional antenna coil, a diameter of the magnetic core member is relatively large, and an interval between the metal article and the antenna coil is relatively large. Therefore, there has been a disadvantage that the antenna coil protrudes excessively from the article which is an object to be controlled.

In order to solve such a disadvantage, an antenna coil which is formed by inserting a magnetic core member into an air-core coil which is wound helically in a plane such that the magnetic core member should be approximately parallel with the plane in the air-core coil (see Japanese Unexamined Patent Application, First Publication No. 2000-48152). The magnetic core member in such an antenna coil is made of an amorphous sheet or a electromagnetic steel plate. The thickness of the antenna coil can be as thin as possible by inserting the magnetic core member so as to be approximately parallel with a plane in the air-core coil. Simultaneously, a magnetic flux is transmitted through the magnetic core member such that a direction of the magnetic flux should be parallel with a plane of the article to which the antenna coil is attached. Thus, the thickness of the space which is inserted between the antenna coil and the article may be thin; therefore, more protrusion of the antenna coil from the article which is an object to be controlled can be reduced than in a conventional case.

However, in the antenna coil in the above Japanese Unexamined Patent Application, First Publication No. 2000-48152, the magnetic core member is made of an amorphous sheet or an electromagnetic steel plate. Therefore, A Q-value which can be used if a frequency is nearly 100 kHz may be obtained. However, if the frequency of the radio wave is as high as several MHz to several ten MHz, there has been a disadvantage in that an eddy current occurs in the amorphous sheet or the electromagnetic steel plate in the magnetic core member; thus, the Q value decreased. Particularly, in recent years, a tag has been realized for actual use in which an RFID technology is used which is activated by the frequency such as 3.56 MHz. There was a disadvantage in that an antenna coil disclosed in Japanese Unexamined Patent Application, First Publication No. 2000-48152 could not be used for a tag which is activated by a high frequency radio wave.

On the other hand, a sintered ferrite has been known conventionally for a magnetic core member which can be used for a high frequency radio wave. However, the sintered ferrite is fragile relatively. In particular, if a sintered ferrite which is formed very thinly so as to be used for a magnetic core member so as to form a thin antenna coil, there may occur a crack on such a magnetic core member; thus, there is a problem in that an actually operable condition may be limited. In contrast, if relatively a thick sintered ferrite plate is used for a magnetic core member so as to enhance the rigidity, the thickness of the antenna coil increases. Therefore, there is a problem in that it is not possible to realize an object to reduce a protrusion of the antenna coil from an article which is an object to be controlled.

Furthermore, there has been other requirement below in the conventional technology.

Conventionally, an antenna coil which is used for an identification tag has been known such as an antenna coil which is made by winding a lead wire of which surface is coated by an insulating layer around an approximate square and attaching on a base plate or by forming an approximate coil main body 2 by removing an unnecessary part from a conductive layer such as an aluminum film or a copper film which is layered on the base plate 1 according to an etching method or a punching method as shown in FIG. 24.

However, in an antenna coil shown in FIG. 24, a magnetic flux is generated in a vertical direction which passes through the base plate 1 as indicated by an arrow in the drawing. If such an antenna coil contacts a metal article, a radio wave which is transmitted toward the antenna coil passes through the base plate 1 and further through the metal article. Therefore, an eddy current is generated on a metal part due to the magnetic flux which passes therethrough; thus, the eddy current generates an undesirable influence. Therefore, there was a problem in that the antenna coil may not be operated properly. Also, even if the antenna coil can be operated, the loss therein increases; thus, there was a problem in that an operable distance of the antenna coil may be shortened to a great extent.

In order to solve such a problem, as shown in FIG. 23, an antenna coil has been known which comprises a magnetic core member 6 which has a plate shape or a cylindrical shape and a conductive member 7 which is wound around the magnetic core member 6 helically. In the antenna coil which is shown in FIG. 23, a magnetic flux is generated in an axial core direction of the magnetic core member 6 as indicated by an arrow in the drawing. Therefore, if the antenna coil is attached to a metal article, a radio wave which is transmitted toward the antenna coil does not pass through the metal article. Thus, a desirable operation in the antenna coil has been anticipated.

However, the antenna coil shown in FIG. 23 is produced by winding a conductive member 7 around an outer surface of the magnetic core member 6. Such a process for winding a conductive member 7 takes times and effort; thus, there has been a disadvantage from a productivity point of view. Also, an entire antenna coil may be relative thick because the conductive member 7 is wound around the magnetic core member 6. If such an antenna coil is attached on a surface of an article, there has been a problem in that the antenna coil protrudes from the article to a great extent relatively.

Also, there has been other requirement in the conventional technology below.

Conventionally, an antenna coil which is used for an identification tag has been known such as an antenna coil which is made by winding a lead wire of which surface is coated by an insulating layer around an approximate square and attaching on a base plate or by forming an approximate coil main body 2 by removing an unnecessary part from a conductive layer such as an aluminum film or a copper film which is layered on the base plate 1 according to an etching method as shown in FIG. 24.

Also, other antenna coil has been known which comprises a magnetic core member 6 which is formed in a plate shape or a cylindrical shape and a conductive member 7 which is wound around the magnetic core member 6 helically.

On the other hand, in the antenna coil shown in FIG. 23, a magnetic flux is generated in an axial core direction of the magnetic core member 6 as indicated by an arrow in the drawing. Therefore, if the antenna coil is attached to a metal article, a radio wave which is transmitted toward the antenna coil does not pass through the metal article. Thus, a desirable operation in the antenna coil has been anticipated. However, the antenna coil which is shown in FIG. 23 is produced by winding the conductive member 7 around an outer surface of the magnetic core member 6. Therefore, there has been a disadvantage in that such a process for winding a conductive member 7 is complicated relatively. Also, an entire antenna coil may be thick relatively; thus, there has been a problem in that the antenna coil may protrude from the article if the antenna coil is attached on a surface of the article.

On the other hand, there were requirements in a conventional transponder. Conventionally, a transponder has been known which comprises an antenna and an IC chip which is connected electrically to the antenna so as to store an information for an article which is an object to be controlled. Also, a transponder which comprises an antenna and a condenser which is connected to the antenna electrically has been known. In a transponder in which an IC chip is connected to the antenna, data which are stored in the IC chip is read out according to a read-out command in a radio wave data communication such that the transponder is activated by transmitting a radio wave having a predetermined frequency from a transmitting/receiving antenna from an interrogator to the antenna, or a read-out operation and writing in operation for data are performed such that the data are written in the IC chip according to the write in command. For a case in which an entering/exiting operation control is performed, such a transponder can perform various information control such as identifying an individual person, and storing times for entrance and exit. Also, for a case in which a manufacturing process is controlled, the transponder can exchange various information such as an instructing for processing a product, storing the process, and controlling a result of product inspection.

On the other hand, the transponder in which a condenser is connected to an antenna has a specific resonating frequency. The transponder emits a radio wave by resonating with a radio wave having a predetermined frequency which is transmitted from the interrogator such that it is identified whether or not the interrogator is a transponder which has a predetermined frequency by the radio wave. Such a transponder cannot exchange as various information as the transponder which has an IC chip. However, such a transponder has an advantage such as a simple structure. For example, such a transponder can be used for measuring how many people enter/exit a room if such a transponder is used for room enter/exit controlling operation. If such a transponder is used for a product manufacturing process, it is possible to measure a quantity of products which pass therethrough. Here, if transponders having different resonating frequencies are used, it is possible to measure the quantity of products for a plurality of classified variations. For example, it is possible to measure the number of people based on male-or-female base, or adult/child base separately. If such a transponder is attached to a commercial commodities in a commercial store, it is possible to monitor a taken-out commodity by disposing an interrogator at an exit. By doing this, there is a case in which a transponder is used such that it is possible to prevent an illegal taken-out of the commercial commodities.

These antennae which are used for a conventional transponder are formed by winding a lead wire of which surface is coated by an insulating layer around an approximate square helically so as to be attached on a base plate or by performing an etching operation or a punching operation for removing an unnecessary part of a conductive layer such as an aluminum which is layered on the base plate or a copper layer in a helical manner. Such a transponder which has an antenna was fixed on an article by screws etc. so as to avoid an undesirable influence from an object to be controlled which is made of a metal member under condition an electrically insulating spacer having 5 to 10 mm thickness is inserted between the transponder and the object.

However, such a space is relatively thick in the above conventional transponder. Therefore, an interval between the metal article and the transponder is relatively large even if the antenna can be formed thin. Thus, there has been a disadvantage in that the transponder protrude from an article which is an object to be controlled to a great extent. Therefore, there was a concern that the transponder may contact various members therearound while the article is transported.

DISCLOSURE OF INVENTION

An object of the present invention is to provide an antenna coil having relatively high rigidity which can be used in a relatively high frequency.

Other object of the present invention is to provide an antenna coil in which a space which should be inserted between the antenna coil and an article is unnecessary such that a protrusion of the antenna coil from an article which is an object to be controlled can be more reduced than the conventional antenna coil.

In addition, an object of the present invention is to provide a tag antenna coil which can be formed quite thinly so as to be operated reliably while contacting the metal article closely. Also, an object of the present invention is to provide a tag antenna coil which is suitable for a mass production.

Furthermore, other object of the present invention is to provide a tag antenna coil and an RFID tag using the tag antenna coil of which thickness is maintained thinly while contacting a metal article closely. Also, an object of the present invention is to provide a tag antenna coil and an RFID tag using the tag antenna coil which are suitable for a mass production.

Also, other object of the present invention is to provide an antenna for a transponder which can be attached to any material condition of a surface directly of an article which is an object to be controlled without using a spacer.

An invention according to a first aspect of the present patent application is an improvement for an antenna coil comprising an air-core coil 12 which is formed by a coil member which is wound on a plane, and a magnetic core member 13 which is inserted in the air-core coil 12 so as to be approximately parallel to the plane in the air-core coil 12.

Its characteristic feature is that the magnetic core member 13 is formed by a composite member of a soft magnetic metal member, a powder of an amorphous member or a powder of a ferrite member or a flake member and a plastic member or a rubber.

In the antenna coil according to a first aspect of the present invention, the magnetic core member 13 is formed by a composite material member; thus, such a magnetic core member 13 is more rigid than a magnetic core member which is formed by a fragile sintered-ferrite. Therefore, it is possible to obtain a rigidity for the antenna coil by using the magnetic core member 13 which is formed by a composite member.

Also, a soft magnetic metal member, an amorphous member, or a ferrite in the composite member are dispersed in a plastic member or a rubber so as to be insulated from each other. Therefore, a magnetic core member 13 which is a composite member is not a conductive member. Therefore, an eddy current is not generated even if the magnetic core member 13 receives a high frequency radio wave. Therefore, a Q value never decreases due to the eddy current even if a radio wave has relatively a high frequency; thus, it is possible to realize an antenna coil which can be used sufficiently reliably in a relatively high frequency radio wave.

An invention according to a second aspect of the present patent application is an antenna coil the magnetic core member 13 which is formed by ejecting the composite member, or compressing the composite member, or re-shaping a flat rolled composite member.

In the antenna coil which is disclosed in the second aspect of the present patent application, it is possible to form the magnetic core member 13 by the composite member. Thus, it is possible to reduce a protrusion from an article by forming a thin magnetic core member 13.

An invention according to a third aspect of the present patent application is an antenna coil in which the magnetic core member 13 is formed by a magnetic coating which is formed by drying the composite after applying the composite.

In the antenna coil according to the third aspect of the present patent application, it is possible to obtain a magnetic core member 13 having 0.8 mm or thinner thickness which is difficult to form in an ejection molding operation and a compressing molding operation. Thus, it is possible to form quite a thin antenna coil. Therefore, it is possible to restrict a protrusion of the antenna coil which is attached on the article from the article to a great extent.

An invention according to a fourth aspect of the present patent application is an improvement for an antenna coil which comprises an air-core coil 12 which is formed by a coil member which is wound on a plane, and a magnetic core member 13 which is inserted in the air-core coil 12 so as to be approximately parallel to the plane in the air-core coil 12.

Its characteristic feature is that a non-magnetic conductive plate 14 is layered on a surface of the air-core coil 12 through which the magnetic core member 13 is inserted.

In the antenna coil which is disclosed in the fourth aspect of the present patent application, an eddy current is not generated on a surface to which the article is attached under condition that an antenna coils is attached onto the metal article such that the conductive plate 14 is disposed between the article and the air-core coil 12 and a radio wave is transmitted; therefore, the conductive plate 14 blocks the radio wave which passes through the air-core coil 12 so as not to pass through the article. As a result, a spacer which has been inserted between the antenna coil and the article conventionally is unnecessary; thus, it is possible to activate the antenna coil reliably. Here, in the antenna coil according to the fourth aspect, the magnetic core member 13 is formed by an amorphous sheet or an electromagnetic steel plate which is operable even if the air-core coil 12 is operated by a relatively low frequency.

An invention according to a fifth aspect of the present patent application is an antenna coil in which the conductive plate 14 is formed by a copper, a copper alloy, an aluminum, or an aluminum alloy.

In the antenna coil which is disclosed in the fifth aspect of the present patent application, it is possible to obtain a conductive plate 14 which can block the transmission of the radio wave through the article reliably.

An invention according to a sixth aspect of the present patent application is an antenna coil the conductive plate 14 has 0.01 to 2 mm thickness.

In the antenna coil which is disclosed in the sixth aspect of the present patent application, an antenna coil which includes the conductive plate 14 can be formed quite thinly; therefore, the protrusion from the article is restricted even if the article is formed by a metal member; thus, it is possible to prevent the antenna coil from contacting various members therearound while transporting the article.

As shown in FIGS. 4 and 5, an invention according to a seventh aspect of the present patent application is an antenna coil which comprises an insulating member 111 which is formed by an electrically insulating film or an electrically insulating sheet, a continuous conductive member 112 which has forwarding sections 112*a* and returning sections 112*b* which are formed alternatively so as to wind on a surface of the insulating member 111, a first magnetic core member 113 which is bonded on a back surface of the insulating member 111 so as to cover the forwarding section 112*b* from the back surface of the insulating member 111 without overlapping the forwarding section 1112*a*.

In the antenna coil which is disclosed in the seventh aspect of the present patent application, the first magnetic core member 113 is bonded to a back surface of the insulating member 111; therefore, the magnetic flux which is generated by an electric current which passes the conductive member 112 passes the first magnetic core member 113 so as to shape a loop which is indicated in a true-line arrow in FIG. 4 so as to be parallel with a surface of the article 18. Even if a surface of the article to which the antenna coil is attached is a metal member, the antenna coil operates reliably without receiving an undesirable influence from the metal member.

Also, the first magnetic core member 113 is bonded onto a back surface of the insulating member 111 so as to cover the conductive member 112*b* from a back of the insulating member 111 without overlapping the forwarding sections 112*a*. Therefore, as shown by a dotted arrow in FIG. 4 in an enlarged manner, the magnetic flux which passes through the first magnetic core member 113 passes above the forwarding sections 112*a* while a part of the magnetic flux disperses in an end section there. The magnetic flux returns back to the neighboring first magnetic core member 113 again such that a continuous conductive member 112 which includes the forwarding sections 112*a* and the 112*b* forms the antenna coil which is wound around a part of the magnetic flux.

An invention according to an eighth aspect of the present patent application is an antenna coil as shown in FIGS. 6 and 7 in which a second magnetic core member 114 covers the forwarding section 112*a* so as not to overlap the returning section 112*b* on the surface of the insulating member 111 such that an end section of the second magnetic core member 114 is bonded so as to overlap an end section of the first neighboring magnetic member 113, and the second magnetic core member 114 introduces a magnetic flux which passes through the first magnetic core member 113 onto a surface of the insulating member 111 on the forwarding section 112*a*.

In the antenna coil according to the eighth aspect of the present patent application, the magnetic flux which passes through the first magnetic core member 113 passes through the first magnetic core member 113 and the second magnetic core member 114 while moving the first magnetic core member 113 and the second magnetic core member 114 alternatively as shown by a true-line arrow in FIG. 6. Therefore, the forwarding sections 112*a* and the 112*b* exist on a top surface and a back surface of the magnetic flux. The continuous conductive member 112 which includes the forwarding sections 112*a* and the conductive member 112*b* form the antenna coil unitarily which is wound around the magnetic flux. As a result of this, it is possible to obtain an antenna coil 10 which has the same characteristics as a conventional antenna coil which has been produced by winding a lead wire around a magnetic core member relatively easily. Thus, it is possible to improve productivity in a mass production better than a case for the conventional antenna coil which has been produced by winding a lead wire therearound.

An invention according to a ninth aspect of the present patent application is an antenna coil in which a plurality of conductive lines 21, 22 are disposed so as to wind on a surface of the insulating member 111 in a predetermined interval along with each other in the continuous conductive member 112, and an end section of the conductive line 21 is connected to a starting end section of the neighboring conductive line 22 as shown in FIGS. 8 and 9.

In the antenna coil which is described in the ninth aspect of the present patent application, the quantity of forwarding sections 21*a* and 22*a* and returning sections 21*b* and 22*b* which exist alternatively on a top surface and a back surface of the magnetic flux which passes through the first magnetic core member 113 and the second magnetic core member 114 are increased; thus, it is possible to increase so-called a turning number easily. By increasing the turning number, it is possible to improve the characteristics in the antenna coil.

An invention according to a tenth aspect of the present patent application is an antenna coil in which the continuous conductive member 112 is formed on a surface of the insulating member 111 by etching a conductive film which is bonded on an entire surface of the insulating member 111 in a predetermined pattern, or performing a screen printing operation or a vapor deposition operation of the conductive member on a surface of the insulating member 111 in a predetermined pattern.

In the antenna coil which is described in the tenth aspect of the present patent application, it is possible to form the conductive member 112 on a surface of the insulating member 111 relatively easily; thus, it is possible to improve the productivity for the antenna coil furthermore.

An invention according to an eleventh aspect of the present patent application is an antenna coil in which either one or both of the first magnetic core member 113 or the magnetic core member 114 is formed by a soft magnetic metal member, a powder or a flake which is formed by an amorphous member or a ferrite member, a plastic composite member, a plate or a film which is formed by a soft magnetic metal member, an amorphous film or its layered member, or a ferrite member.

In the antenna coil which is described in the eleventh aspect of the present patent application, the first magnetic core member 113 or the second magnetic core member 114 is relatively thin. By forming the first magnetic core member 113 and the second magnetic core member 114 which form an entire part in a thickness direction of the antenna coil thinly, it is possible to form an entire antenna coil thinly.

An invention according to twelfth aspect of the present patent application is an antenna coil in which either one or both of the first magnetic core member 113 and the magnetic core member 114 is formed by a magnetic coating which is formed by applying an ink or an applying member which include a magnetic powder onto the insulating member 111 and drying the ink or the applying member.

In the antenna coil which is described in the twelfth aspect of the present patent application, it is possible to obtain the magnetic core members 13 and 114 having a thickness such as 0.8 mm or thinner which is difficult to form in an injection molding operation. Thus, it is possible to form the thickness of the antenna coil very thinly. Therefore, it is possible to restrict the protrusion of the antenna coil from the article when the antenna coil is attached onto the article very much.

An invention according to a thirteenth aspect of the present patent is an antenna coil in which a conductive member 116 made of a sheet member or a plate member is bonded onto a back surface of the insulating member 111 so as to cover the first magnetic core member 113.

In the antenna coil which is described in the thirteenth aspect of the present patent application, the conductive member 116 is disposed between the conductive member 12 and the article; therefore, the conductive member 16 blocks the transmission of the radio wave toward the article. Therefore, there is not generated a loss due to an eddy current etc. which is generated on a surface of the metal member even if a surface of the article is formed by a metal member. As a result, it is possible to operate the antenna coil reliably.

An invention according to a fourteenth aspect of the present patent application is a tag antenna coil which comprises a coil main body 21*a* which is formed by a conductive coil member 211 which is wound in a plane, and a magnetic core member 213 made of a sheet member or a plate member which is bonded on a surface of the coil main body 211*a* such that an end 213*a* of the magnetic core member 213 is disposed in a central section 211*b* which is surrounded by the coil main body 211*a* and another end 213*b* of the magnetic core member 213 is disposed at an outside of the coil main body 211*a* so as to cross a part of the coil main body 21*a* as shown in FIGS. 11 and 12.

In the tag antenna coil which is described in the fourteen aspect of the present patent application, the magnetic core member 213 is bonded so as to be across a part of the coil main body 211*a*; therefore, it is possible to enhance the Q value of the antenna coil. Also, the magnetic flux which is generated by an electric current which passes the coil main body 211*a* which is formed by the conductive coil member 211 passes through its magnetic core member 213 so as to shape a loop which is shown by a true-line arrow in FIG. 11. Therefore, the direction of the magnetic flux is parallel with a surface of the article; thus, an eddy current which is generated on a metal member of a surface of the article is restricted even if the tag antenna coil is attached onto a surface of the article which is formed by a metal member. Thus, the antenna coil is operated reliably.

An invention according to a fifteenth aspect of the present patent application is a tag antenna coil in which the coil main body 211a is formed by punching a conductive plate or a conductive film.

In the tag antenna coil according to the fifteenth aspect of the present patent application, it is possible to form the coil main body 211a easily; thus, it is possible to improve the productivity for the antenna coil.

An invention according to a sixteenth aspect of the present patent application is a tag antenna coil in which the coil main body is formed by etching a conductive film which is bonded on an entire main surface of an electrically insulating film or a sheet 212 in a predetermined pattern, or performing a screen printing operation or a vapor deposition operation of the conductive member on an entire main surface of the electrically insulating film or the sheet 212 in a predetermined pattern.

In the tag antenna coil according to the sixteenth aspect of the present patent application, the conductive coil member 211 is disposed on an electrically insulating film 212 or a sheet; therefore, it is possible to handle it easily. Therefore, it is possible to obtain an antenna coil by an easy operation such as only layering and attaching the magnetic core member 213 onto another main surface of a film or a sheet 212. Thus, it is possible to improve the productivity in a mass production with compared to a case for a conventional antenna coil which is shown in FIG. 23 in which a lead wire is wound around an outer surface of a magnetic core member.

An invention according to a seventeenth aspect of the present patent application is a tag antenna coil in which the magnetic core member 213 is a magnetic coating which is formed by applying a soft magnetic metal member, a powder or a flake which is formed by an amorphous member or a ferrite member, a plastic composite member, a plate or a film which is formed by a soft magnetic metal member, an amorphous film or its layered member, or a ferrite member, or an ink or an applying member which include a magnetic powder onto an electrically insulating film or a sheet and drying the ink or the applying member.

In the tag antenna coil according to the seventeenth aspect of the present patent application, the magnetic core member 213 is relatively thin. Thus, it is possible to form an entire antenna coil thinly by forming the magnetic core member 213 thinly which occupies a most part of the antenna coil in a thickness direction.

An invention according to an eighteenth aspect of the present patent application is a tag antenna coil in which the magnetic core member 213 is a magnetic coating which is formed by applying an ink or an applying member which include a magnetic powder onto another main surface of the electrically insulating film or a sheet 212 and drying the ink or the applying member.

In the tag antenna coil according to the eighteenth aspect of the present patent application, it is possible to obtain the magnetic core member 213 having 0.8 mm or thinner thickness which is difficult to form in the injection molding operation and a compressing molding operation. Therefore, it is possible to form the antenna coil with a very thin thickness. Also, it is possible to restrict the protrusion of the antenna coil from the article very much when the antenna coil is attached onto the article.

An invention according to a nineteenth aspect of the present patent application is a tag antenna coil in which a conductive member 216 made of a sheet member or a plate member is bonded onto a surface of the coil main body 211a so as to cover the magnetic core member 213.

In the tag antenna coil according to the nineteenth aspect of the present patent application, its conductive member 216 is disposed between the coil main body 211a which is formed by the conductive coil member 211 and the article; therefore, the conductive member 216 block a transmission of the radio wave toward the article. Therefore, the antenna coil can be operated reliably without generating a loss due to an eddy current which is generated on a metal surface even if a surface of the article is formed by a metal member.

An invention according to a twentieth aspect of the present patent application is an RFID tag which comprises an antenna coil 10 which is attached to an article 18, and an IC chip which is connected to the antenna coil 10 electrically such that a specific information for each article 18 is stored in the IC chip, such that the antenna coil 10 is attached to the article such that the magnetic core member 213 is disposed between the article 18 and the coil main body 211a.

In the RFID tag according to the twentieth aspect of the present patent application, the magnetic flux which is generated by an electric current which passes the coil main body 211a passes mainly through the magnetic core member 13 when the magnetic core member 213 is disposed so as to neighbor the article 18; thus, few magnetic flux passes through the article 18. Therefore, the antenna coil 10 hardly receive its undesirable influence with regardless to whether or not the article 18 is a metal member. Thus, the RFID tag in which the antenna coil 10 is used is operated reliably.

An invention according to a twenty-first aspect of the present patent application is an improvement of a transponder antenna as shown in FIGS. 15 and 16 which is connected to an IC chip 313 or a condenser electrically so as to be attached to an article 311.

Its feature is that it comprises a conductive plate member 314a of which back surface is attached to the article 311, a coil main body 314b which is wound helically on a surface of the conductive member 314a via an insulating member 316 and fixed thereon such that a turning number and a coil diameter are adjusted so as to realize a predetermined characteristic value under a wound condition.

In the transponder antenna according to the twenty-first aspect of the present patent application, the coil main body 314b is adjusted so as to obtain a predetermined characteristics value under condition that the coil main body 314b is wound around an outer surface of the conductive plate member 314a. Therefore, if an IC chip is connected to the antenna in the transponder, it is possible to activate the transponder 12 reliably by transmitting a radio wave having a predetermined frequency from a transmitting/receiving antenna in an interrogator which is not shown in the drawing to the antenna 314. If a condenser is connected to the antenna in the transponder, it is possible to resonate with the radio wave which is transmitted from the interrogator reliably. Also, in the antenna 314, the coil main body 314b is wound around an outer surface of the conductive plate member 314a in advance; thus, a predetermined characteristic value is obtained. Therefore, if the antenna 314 is attached to a metal article directly which is an object to be controlled, the coil main body 314b does not receive an undesirable influence from the metal article; therefore, the characteristic value in the coil main body 314*b* does not vary to a great extent. Therefore, a space which has been necessary for attaching the antenna 314 to the metal article is not necessary; thus, it is possible to prevent the transponder 12 from protruding from the article which is an object to be controlled to a great extent.

For a shape of the conductive plate member 314*a*, it is possible to name a sheet, a plate, a helical member both end of which are connected such that an electric resistance per 1 cm width and 1 cm length is 5Ω or less.

Also, as shown in FIG. 15 in an enlarged manner, for a material for the insulating member 316, non-conductive material is preferable such as a sheet, a plate, or a film which is formed by a polyethylene member or a polyethylene terephthalate member.

In such a case, it is acceptable if the conductive plate member 314*a* may be a conductive coating which is made by applying a conductive ink onto a back surface of such a insulating member 316 and drying thereof. Also, it is acceptable if the conductive plate member 314*a* may be a conductive plating layer or a conductive vapor deposition layer such as a Cu or Al which are made by layering on a back surface of the insulating member 316. In such a case, it is preferable that an insulating member 316 having 0.01 to 5 mm thickness be used such that an interval between the conductive plate member 314*a* and the coil main body 314*b* should be 0.01 to 5 mm.

Furthermore, as shown in FIG. 17, it is possible to form a hole 314*c* in a section which is surrounded by the coil main body 314*b* in the conductive plate member 314*a*. As shown in FIG. 19, it is possible to dispose a soft magnetic member 26 between the conductive plate member 314*a* and the coil main body 314*b*. In a case in which a hole 314*c* is formed on the conductive plate member 314*a* which is in a central part of the coil main body 314*b*, if an eddy current is generated in the conductive plate member 314*a* due to a radio wave which passes through the coil main body 314*b*, such an eddy current is generated in a narrow range which neighbors the coil main body 314*b* because of the hole 314*c*; thus, it is possible to restrict a decrease in the Q value in the coil main body 314*b*. On the other hand, if the soft magnetic member 26 is disposed between the conductive plate member 314*a* and the coil main body 314*b*, the coil main body 314*b* is electrically separated from the conductive plate member 314*a* by the soft magnetic member 26; thus, the Q value in the coil main body 314*b* improves. Therefore, it is possible to adjust the turning number or the turning diameter of the coil main body 314*b* relatively easily so as to obtain a predetermined characteristic value.

An invention according to twenty-second aspect of the present patent application is an improvement for a transponder antenna as shown in FIG. 20 which is connected to an IC chip 313 or a condenser electrically so as to be attached to the article 311.

Its characteristic feature is that the transponder antenna comprises a flat pate soft magnetic member 26 of which back surface is attached onto the article 311 and a coil main body 314*b* of which turning number and turning diameter are adjusted such that a predetermined characteristic value can be obtained under condition that it is wound around a surface of the soft magnetic member 26 so as to be fixed therearound.

In the transponder antenna according to the twenty-second aspect of the present patent application, when a radio wave is transmitted under condition that an antenna 314 is attached onto the article 311 which is made by a metal member, the soft magnetic member 26 blocks the radio wave so as not to pass toward the metal part; thus, an eddy current is not generated in such a metal part. As a result, even if the article 311 is formed by a metal member, a space which has been necessary is not necessary. Therefore, it is possible to prevent the antenna 314 from contacting the members therearound while transporting the article 41.

Here, it is preferable that a product of a transmission rate of the soft magnetic member 26 and a thickness represented in a unit such as mm indicates 0.5 or larger. Also, it is preferable that the soft magnetic member 26 is formed by any one of members such as an amorphous alloy, a Permalloy, a magnetic steel, a silicon steel, a sendust alloy, a quench solidified member for Fe—Al alloy or a soft magnetic ferrite, a casted member, a rolled strip member, a forged member, or a sintered member. Also, it is preferable that the soft magnetic member 26 is a coating of a powder of a soft magnetic metal member or a soft magnetic ferrite, or composite member of a flake, a plastic member, or a rubber, or a applying member of a powder of a soft magnetic metal member or a powder of a soft magnetic ferrite, or a flake. Furthermore, it is acceptable if the soft magnetic member 26 is a sheet which is formed by bonding a plurality of flakes which are made of a soft magnetic metal member or a soft magnetic ferrite onto a surface of a plastic base sheet such that the flakes contact closely each other. Also, it is acceptable if the soft magnetic member 26 is a sheet which is formed by bonding a plurality of flakes which are made of a soft magnetic metal member or a soft magnetic ferrite onto a surface of a plastic base sheet such that the flakes contact closely each other, covering the flakes by a plastic cover sheet, and attaching the base sheet and the cover sheet.

BEST MODE FOR CARRYING OUT THE INVENTION

Next, embodiments of the present invention are explained with reference to drawings below.

Figure 1:
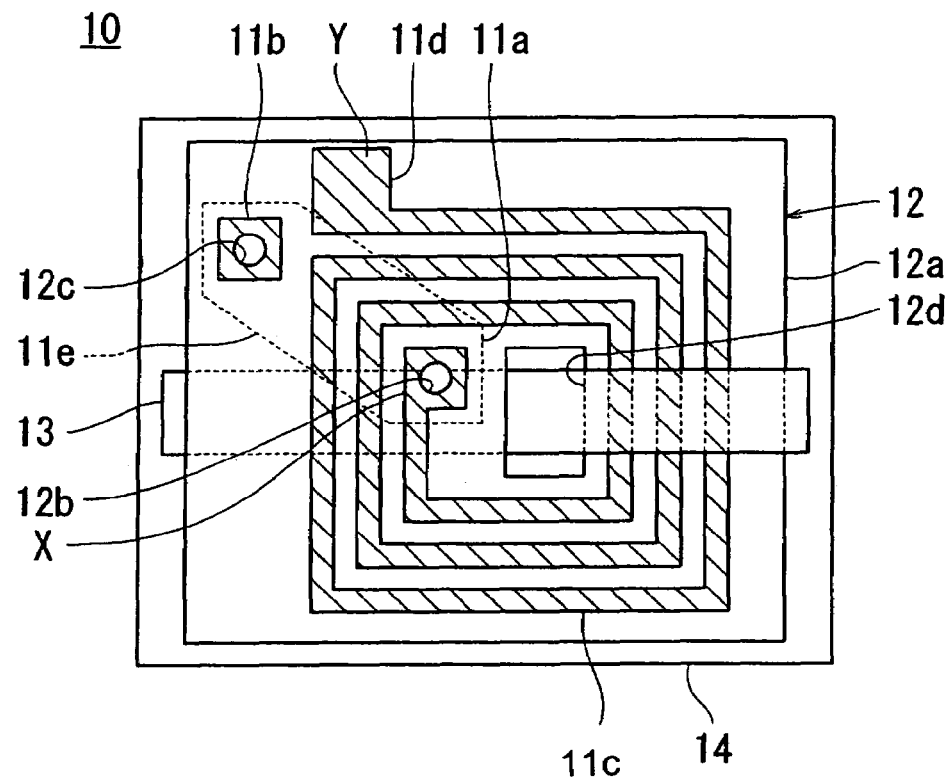
FIG. 1 is a plan view of an antenna coil according to the present patent application.
Figure 2:
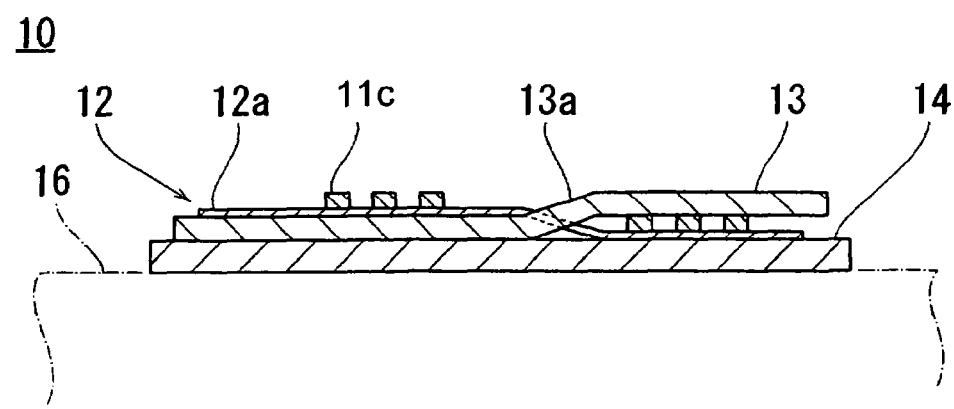
FIG. 2 is a cross section of FIG. 1 so as to describe the condition in which the antenna coil is attached onto an article.

As shown in FIGS. 1 and 2, an antenna coil 10 according to the present invention comprises an air-core coil 12 which is formed by winding a conductive member 11c helically in a plane and a flat plate magnetic core member 13 which is inserted into the air-core coil 12 so as to be approximately parallel with a plane in the air-core coil 12. The air-core coil 12 is formed by winding a coated lead wire which forms the conductive member 11c or by punching or etching a conductive plate in a predetermined pattern. Also, the air-core coil 12 can be formed by etching a copper film which is layered on an electrically insulating film or a sheet or by performing a screen printing operation or a vapor deposition operation for a conductive member on a main surface of an electrically insulating film or a sheet. In such a case, it is necessary to form a hole such as a hole in a doughnut through which a magnetic core member 13 should be inserted in a central part of the air-core coil 12 on an electrically insulating film or a sheet.

Figure 3:
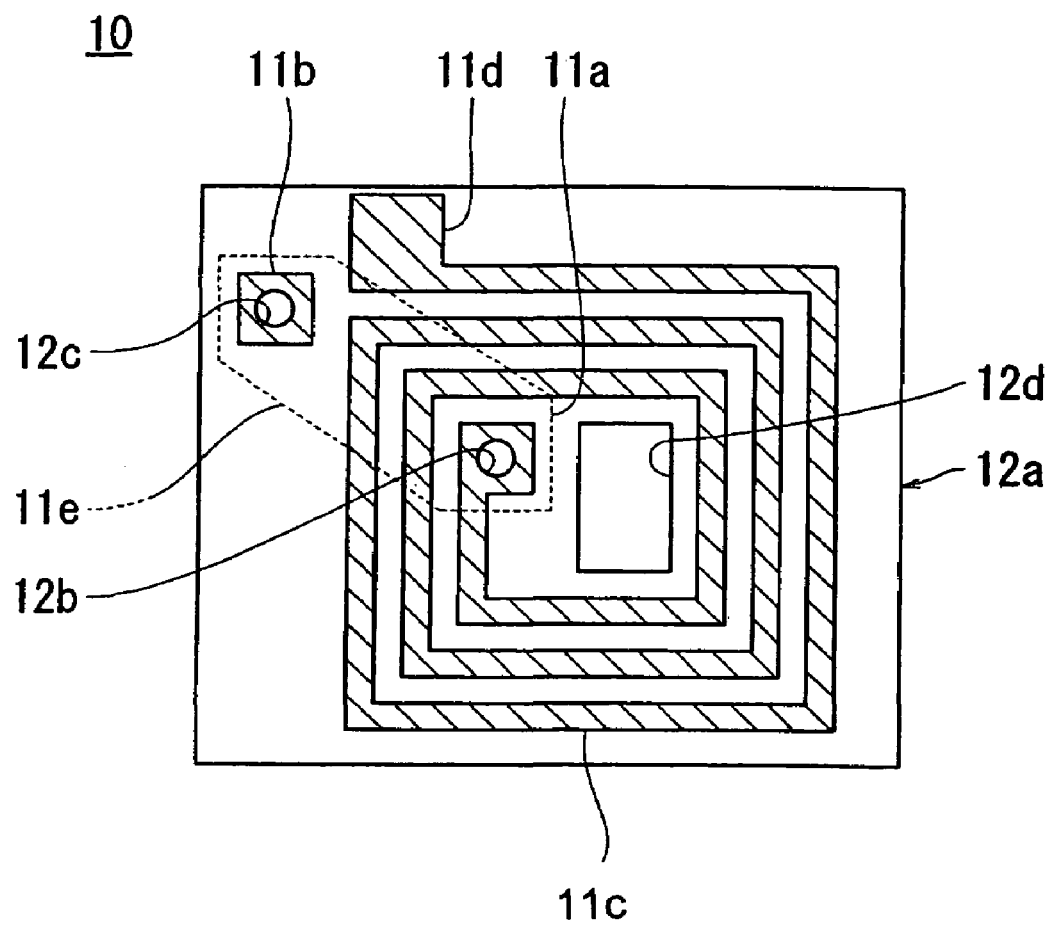
FIG. 3 is a plan view for an air-core coil in the antenna coil.

For a representative example, a case in which a air-core coil 12 is formed by etching a copper layer which is layered on an electrically insulating film 12a is explained. First, a film 12a which has copper films on both surfaces of the of the film 12a is prepared. As shown in FIG. 3, a first through hole 12b is formed near a central part of the film 12a. A second through hole 12c is formed near an outer marginal section of a film near the first through hole 12b. After that, an anti-etching paint is printed on both surfaces of the film 12a by a silk screen method. The anti-etching paint is applied on a surface of the film 12a in a rectangular helical manner such that a circumferences of the first through hole 12b and the second through hole 12c, and the first through hole 12b should be inner ends and an outer end should be disposed near the second through hole 12c. Consequently, a wide paint section is formed on an outer end of the coil. In addition, an anti-etching paint is applied so as to be dried on another surface of the film 12a such that the first through hole 12b and the second through hole 12c communicate therebetween. Consequently, a copper film on which a paint is not applied is removed by an etching operation; thus, a copper film on a section on which an anti-etching paint is applied remains on the film 12a.

After that, the anti-etching paint is removed from the copper film which remains on the film 12a. Also, a first terminal 11a and a second terminal 11b around the first through hole 12b and the second through hole 12c, a helical coil section 111c in a rectangular coil manner having an inner end such as a first terminal 11a, and an intermediate terminal 11d which is formed by a wide section on an outer end of the coil section 11c are formed on a surface of the film 12a by a remaining copper film. In addition, a connective conductive member 11e which connects the first through hole 12b and the second through hole 12c on another surface of the film 12a by the remaining copper film. After that, inner surfaces of the first through hole 12b and the second through hole 12c are plated. The first terminal 11a and the connective conductive member 11e are connected. The second terminal 11b and the connective conductive member 11e are connected. Thus, the first terminal 11a and the second terminal 11b are connected electrically via the connective conductive member 11e. After that, a hole 12d through which the magnetic core member 13 is inserted is formed by a pressing operation; thus, an air-core coil 12 is obtained. In such an air-core coil 12 which is obtained by etching a copper film which is layered on the electrically insulating film 12a, it is possible to form a tag by connecting an IC or a condenser between the second terminal 11b and the intermediate terminal 11d.

Referring back to FIGS. 1 and 2, the magnetic core member 13 is formed by a composite member. The composite member is formed by a soft magnetic metal member, an amorphous or a ferrite powder or a flake, or a plastic member or a rubber. For such a soft magnetic metal member, it is preferable to use a carbonyl iron powder or a reduced iron powder because a fine powder can be obtained easily. The reduced iron powder can be obtained by performing a low-temperature reduction operation for a fine iron oxide in a hydrogen gas. Also, for such a soft magnetic metal member, it is acceptable if an iron, Permalloy, and amorphous powder which are produced according to an atomizing method be used. Also, it is acceptable if an amorphous alloy flake be used which is formed by crushing a soft magnetic metal powder which is obtained by an atomizing method by using a crushing device or a ball-end mill and colliding a powder and a melt alloy grain which are mechanically flattened onto a surface of a copper which is cooled by a water.

On the other hand, it is preferable to use an insulating resin such as an acrylic member, a polyester, a polyvinyl chloride, a polyethylene, a polystyrene, and an epoxy for such a plastic member. Also, it is possible to use any synthetic rubber such as a natural rubber and a butyl rubber for a rubber.

For a method for producing a composite member, a method is appropriate in which a mixture of a soft magnetic metal member, a powder of an amorphous member or a powder of a ferrite member or a flake member and a plastic member or a rubber is kneaded so as to form a pellet for forming in a predetermined shape by an injection molding operation or a compressing molding operation. When the magnetic core member 13 is formed in an injection molding operation or a compressing molding operation, a flat plate stage section 13a can be formed in the magnetic core member 13 unitarily with the air-core coil 12 as shown in FIG. 2 simultaneously with its molding. Thus, it is possible to obtain a relatively thin antenna coil 10 relatively easily. In such a case, a magnetic field is established in a magnetic direction when the above mixture is injected or compressed so as to dispose the soft magnetic metal members in arrays, the characteristics for the antenna coil 10 may be improved further. Also, it is acceptable if the above mixture may be flattened by a roll so as to be slits, compressed to be deformed, or casted in a mold. In any of the above cases, the characteristics are improved by disposing the soft magnetic metal members in arrays by establishing a magnetic field.

When a soft magnetic metal member or an amorphous powder are used, it is preferable that its diameter should be in a range of 0.6 to 100 μm. More preferably, it should be in a range of 1 to 43 μm.

If the soft magnetic metal member or the amorphous are flakes, its thickness should preferably be in a range of 0.1 to 10 μm. More preferably, its thickness should be in a range of 0.3 to 5 μm. If the diameter of the soft magnetic metal member or the amorphous powder is smaller than the above ranges, the powder intends to be oxidized more easily. If it is larger than the above ranges, there is a problem in that a loss due to an eddy current increases. For a mixture ratio of the composite member, 10 to 95% of the amorphous or the ferrite should be preferable. More preferably, it should be 40 to 90%. The rest of the ratio indicates a plastic or a rubber. If the soft magnetic metal member, the amorphous, or the ferrite are contained less than the above range, there is a problem that a magnetic permeability is too low. If the soft magnetic metal member, the amorphous, or the ferrite are contained more than the above range, the soft magnetic metal member, the amorphous, or the ferrite contact with each other; thus, the magnetic core member 13 may be conductive; therefore, there is a concern that the loss increases.

On the other hand, a non-magnetic conductive plate 14 is layered on a surface of the air-core coil 12 through which the magnetic core member 13 is inserted. The conductive plate 14 is made of a copper, a copper alloy, or an aluminum, or an aluminum alloy so as to be bonded on a surface of the air-core coil 12 through which the magnetic core member 13 is inserted. The conductive plate 14 is disposed between the air-core coil 12 and the article 16 so as to seal the air-core coil 12 from the article 16 electro-magnetically. Thickness of the conductive plate 14 is 0.01 to 2 mm. If the thickness of the conductive plate 14 is smaller than 0.01, an essential effect such as electromagnetic sealing cannot be anticipated. If the thickness of the conductive plate 14 exceeds 2 mm, an interval between the article 16 and the air-core coil 12 may increase; thus, there is a disadvantage that the air-core coil 12 may protrude from the article 16 to a great extent.

In the antenna coil 10 which is formed as above, the magnetic core member 13 is formed by a composite member. Therefore, the antenna coil 10 is more rigid with compared to a magnetic core member which is formed by a fragile ferrite-sintered-member. Therefore, it is possible to obtain a rigidity in the antenna coil by using the magnetic core member 13. Also, the soft magnetic metal member, the amorphous or the ferrite are dispersed in a plastic or a rubber and insulated from each other. Therefore, an entire magnetic core member 13 is not conductive; thus, an eddy current is not generated even if it receives a high frequency radio wave. Therefore, even if a frequency of a radio wave which is emitted from a transmitting antenna which is not shown in the drawing is relatively high such as several MHz to several ten MHz, the Q value does not decrease due to the generated eddy current. As a result, the antenna coil 10 of the present invention is relatively rigid. Compatibly, it is possible to use the antenna coil 10 sufficiently in a relatively high frequency.

In particular, in the present embodiment, the non-magnetic conductive plate 14 is layered on a surface of the air-core coil 12 through which the magnetic core member 13 is inserted; therefore, if the air-core coil 12 is attached onto the article 16 via the conductive plate 14, the conductive plate 14 is disposed between an attaching surface of the article 16 and the air-core coil 12. Therefore, the air-core coil 12 is blocked from the article 16 electrically; thus, it is possible to prevent the self-inductance in the air-core coil 12 from varying and the Q value from decreasing perfectly. In particular, it is effective for a case in which the article 16 is formed by a ferromagnetic member. This is because of following reasons. That is, if the above conductive plate 14 is bonded onto the air-core coil 12 which faces to the attaching surface of the article 16 which is made of a ferromagnetic member, the magnetic flux which is about to pass through the article 16 among the magnetic flux which is emitted from the magnetic core member 13 passes above the conductive plate 14 which has a high conductivity. Also, the conductive plate 14 is a non-magnetic member; therefore, there is very few hysteresis loss; thus, very few eddy current is generated. Thus, the article 16 which is made of a ferromagnetic member does not affect the air-core coil 12 undesirably.

Here, in the above embodiment, an example is shown in which the magnetic core member 13 is formed by performing an injection molding operation or a compressing molding operation, or a flattening molding operation for the composite member. It is acceptable if the magnetic core member 13 may be formed by applying and drying the composite member. In such a case, it is preferable to apply and dry the composite member on an insulating resin film or a sheet which are not shown in the drawing. Here, it is preferable that the thickness of the insulating resin film or the sheet should by 100 to 200 μm when the magnetic coating is formed. More preferably, it should be 30 to 150 μm. Also, the thickness of the formed magnetic coating should be 10 to 800 μm. More preferably, it should be 30 to 300 μm. Here, if it is not possible to obtain a predetermined thickness in a single applying operation for a paint, it is possible to obtain a desirable thickness of coating by applying and drying the same paint repeatedly. By doing this, the rigidity for the magnetic core member is obtained by an insulating resin film or a sheet if a magnetic core member which is made of a magnetic coating is formed on a surface of the insulating resin film or the sheet. Simultaneously, it is possible to obtain a magnetic core member 13 which having 0.8 mm thickness or thinner which is difficult to form in an injection molding operation. Furthermore, it is possible to obtain a thin antenna coil 10.

Next, examples of the present invention are explained with reference to a comparative example in detail below.

EXAMPLE 1

First, an air-core coil is formed on a main surface of an electrically insulating film. For the electrically insulating film, a polyimide film having 50 mm longitude and 50 mm latitude and 50 μm thickness is used. A copper film having 35 μm thickness is layered to be bonded on a main surface of the polyimide film so as to etch the copper film. By doing this, an air-core coil which is wound helically in a four-time rectangular manner is formed on a main surface of the polyimide film. The conductive member which forms the air-core coil is formed so as to have 0.8 mm width. An outer shape of the air-core coil is formed so as to have a dimension such as 18 mm×47 mm.

Next, a mixture of 92 weight % of a carbonyl iron powder and a nylon resin is injected into a mold. By doing this, a magnetic core member 13 which is formed by a composite member having 0.87 mm thickness and 35 mm×52 mm dimension is obtained. Consequently, a hole having 35 mm×1 mm of dimension is formed on an electrically insulating film which is disposed in a center of the air-core coil. The magnetic core member 13 is inserted into the hole so as to be approximately parallel with a plane of the air-core coil; thus, an antenna coil is obtained. A comparative example 1 is an antenna coil which has a magnetic core member which is obtained by injecting the composite member into a mold.

EXAMPLE 2

An air-core coil which is the same as that of the example 1 is formed on an electrically insulating film which is the same as the electrically insulating film of the example 1 by the same conductive member as that of the example 1 by the process which is the same as the process in the example 1. Also, a paint is prepared in which 70 weight % of amorphous flake, 10 weight % of acrylic resin, and 20 weight % of ethyl acetate as a solvent are mixed. The paint is applied and dried on an entire main surface of a film which is formed by a polyethylene terephthalate having 0.1 mm thickness. Thus, a magnetic coating having 0.1 mm thickness is obtained. A film on entire main surface of which the magnetic coating is formed is cut in to a dimension of 35 mm×60 mm with the magnetic coating. Thus, the magnetic core member 13 which is made of a magnetic coating which is formed by applying and drying the composite member is obtained. Consequently, a hole having 35 mm×1 mm of dimension is formed on an electrically insulating film which is disposed in a center of the air-core coil. The magnetic core member 13 is inserted into the hole so as to be approximately parallel with a plane of the air-core coil; thus, an antenna coil is obtained. An example 2 is an antenna coil which has a magnetic core member which is formed by the magnetic coating.

COMPARATIVE EXAMPLE 1

An air-core coil which is the same as that of the example 1 is formed on an electrically insulating film which is the same as the electrically insulating film of the example 1 by the same conductive member as that of the example 1 by the process which is the same as the process in the example 1. Also, a magnetic core member which is formed by a layered member of an amorphous film having 4 layers of amorphous films having 10 mm×60 mm of dimension and 20 µm thickness is prepared. Consequently, a hole having 35 mm×1 mm of dimension is formed on an electrically insulating film which is disposed in a center of the air-core coil. The magnetic core member 13 is inserted into the hole so as to be approximately parallel with a plane of the air-core coil; thus, an antenna coil is obtained. A comparative example 1 is an antenna coil which has a magnetic core member which is formed by the layered Member of the amorphous film.

<Comparative Test>

Measurement terminals in a measurement device (Model 4396 commercially available under trade mark which is registered by HEWLETT PACKARD) for measuring characteristics in a coil are connected to both ends of the air-core coil in the antenna coils in the examples 1 and 2, and a comparative example. An L value and Q value in the air-core coils are measured respectively which correspond to the predetermined frequency by the measurement device.

Also, an aluminum plate as an article is prepared which has 100 mm×100 mm dimension and 0.16 mm thickness. IC chips are connected to the air-core coils in the comparative example 1 and examples 1 to 3 respectively so as to form tags which can be operated by a frequency of 13.56 MHz by the IC chips and the antenna coil. It is confirmed whether or not the tags are operated if the tags are disposed on surfaces of the aluminum plate respectively. The result is shown in a TABLE 1.

TABLE 1

| Predetermined Frequency (MHz) | Example 1 Composite Member | | Example 2 Magnetic Coating | | Example 3 Amorphous Film | |
|---|---|---|---|---|---|---|
| | L (µH) | Q | L (µH) | Q | L (µH) | Q |
| 1 | 1.556 | 9.1 | 1.405 | 8.1 | 1.886 | 5.4 |
| 2 | 1.535 | 16.0 | 1.385 | 13.8 | 1.771 | 6.0 |
| 3 | 1.527 | 21.4 | 1.376 | 17.8 | 1.696 | 6.6 |
| 4 | 1.524 | 26.2 | 1.371 | 20.8 | 0.164 | 6.6 |
| 5 | 1.525 | 30.8 | 1.367 | 23.2 | 1.665 | 6.6 |
| 6 | 1.526 | 34.9 | 1.368 | 25.1 | 1.576 | 6.7 |
| 7 | 1.529 | 38.1 | 1.368 | 26.4 | 1.550 | 6.6 |
| 8 | 1.532 | 41.3 | 1.367 | 27.8 | 1.533 | 6.6 |
| 9 | 1.538 | 44.5 | 1.379 | 28.3 | 1.517 | 6.6 |
| 10 | 1.543 | 47.0 | 1.374 | 30.1 | 1.502 | 6.7 |
| 11 | 1.549 | 49.3 | 1.379 | 31.1 | 1.490 | 6.7 |
| 12 | 1.558 | 52.2 | 1.304 | 31.7 | 1.483 | 6.7 |
| 13 | 1.567 | 53.9 | 1.389 | 31.9 | 1.476 | 6.7 |
| 14 | 1.576 | 55.6 | 1.396 | 32.6 | 1.470 | 6.8 |
| 15 | 1.587 | 57.6 | 1.403 | 32.6 | 1.467 | 6.7 |
| 20 | 1.654 | 61.6 | 1.445 | 32.1 | 1.404 | 6.7 |
| Confirmation of Operation | Operated | | Operated | | Operated | |

As understood from the TABLE 1, it is understood that the Q value is improved by comparing the Examples 1 and 2 to the comparative example 1. The reason for this is estimated that the magnetic core member is an amorphous film in the comparative example 1; thus, an eddy current is generated on the magnetic core member. On the other hand, in the examples 1 and 2, it is estimated that the magnetic core member is formed by a composite member; therefore, an eddy current is not generated on the magnetic core member. Also, the tag in which the antenna coils of the examples 1 and 2 are connected to the IC chip can be operated even if the tag is disposed on a surface antenna coil of the comparative example 1 does not operate. It is also estimated that this is because the L value in the antenna coil of the comparative example 1 varies according to whether or not the eddy current is generated; thus, the resonation frequency varies and the energy is absorbed; thus, a loss is generated.

Next, a second embodiment of the present invention is explained with reference to drawings.

Figure 4:
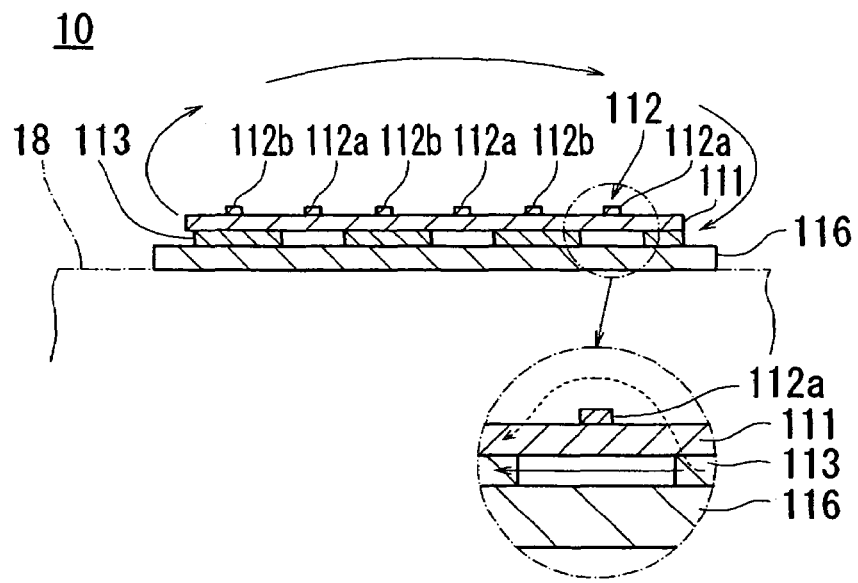
FIG. 4 is a cross section viewed in a line A—A shown in FIG. 5 so as to describe an antenna coil according to a third embodiment of the present patent application.
Figure 5:
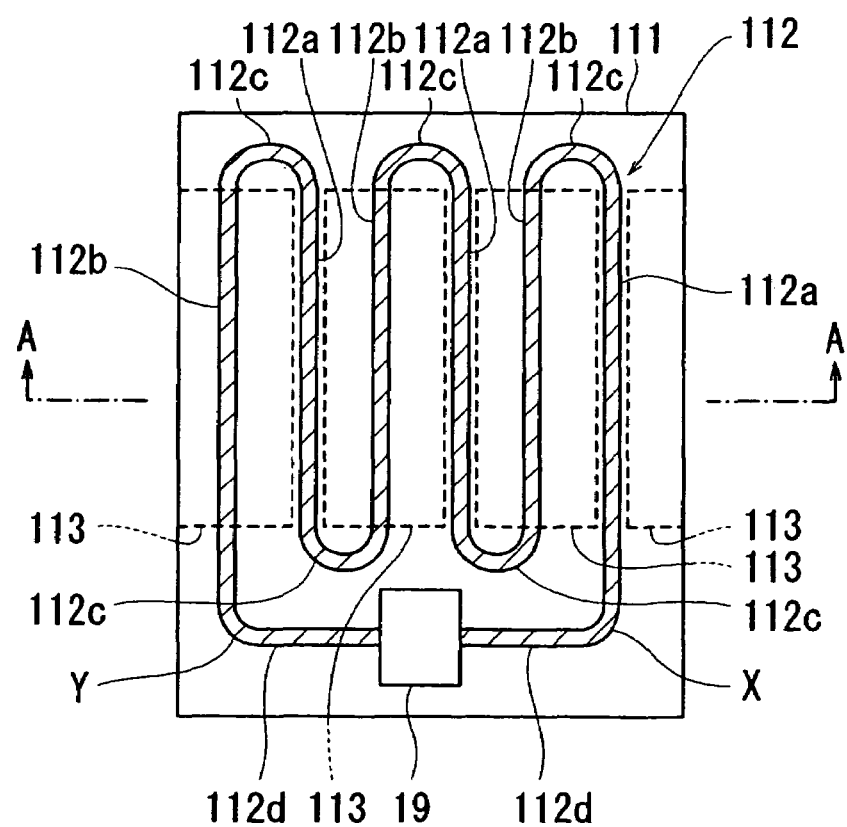
FIG. 5 is a plan view for an antenna coil.

As shown in FIGS. 4 and 5, the antenna coil 10 comprises an insulating member 111 which is formed by an electrically insulating film or an electrically insulating sheet, a conductive member 112 which is formed by a conductive member to wind on a surface of the insulating member 111, and a first magnetic core member 113 which is bonded on a back surface of the insulating member 111. The insulating member 111 is formed in a rectangular shape by an electrically insulating plastic film or a sheet, or a paper. It is preferable that the insulating member 111 should be formed by a plastic film or a plastic sheet such as a polyester or a polyimide. The conductive member 112 can be formed on a surface of the insulating member 111 by etching a conductive film which is bonded on a surface of the insulating member 111, bonding a conductive film which is punched in a predetermined pattern or a thin plate on a surface of the insulating member 111, or performing a screen printing operation or a vapor deposition operation of the conductive member such as Cu, Al, Zn on a surface of the insulating member 111 in a predetermined pattern.

As shown in FIG. 5, forwarding sections 112a and returning sections 112b which extend in a longitudinal direction are formed alternatively so as to have a predetermined interval in its width direction on a surface of the insulating member 111 in the insulating member 111. Also, the conductive member 112 has a plurality of connecting sections 112c which connect the both ends of the forwarding sections 112a and the returning sections 112b alternatively so as to wind the forwarding sections 112a and the returning sections 112b. Also, a pair of lead sections 112d, 112d are formed on a surface of the insulating member 111. Ends of the conductive member 112d are connected to the forwarding sections 112a and the returning sections 112b respective which are positioned in a width direction on both ends of the insulating member 111. The other ends are disposed so as to be near an approximate center in a width direction of the insulating member 111 with each other. The IC chip and the condenser 19 are bonded onto a surface of the insulating member 111 under condition that the IC chip and the condenser 19 are connected to other ends of a pair of lead sections 112d, 112d electrically respectively.

On the other hand, the first magnetic core member 113 is bonded on a back surface of the insulating member 111 so as to cover the returning sections 112b from a back surface of the insulating member 111 without overlapping the forwarding sections 112a. It is possible to form the first magnetic core member 113 by a soft magnetic metal member, or a composite member which is formed by a powder or a flake and a plastic which are formed by a soft magnetic metal member, an amorphous member or a ferrite member. Also, it is acceptable if the first magnetic core member 113 may be formed by an amorphous film or its layered member such as an Fe amorphous alloy (METGLAS 2605-2 commercially available under a trademark of Alliedchemical corp.) and a Co amorphous alloy (METGLAS 2712A commercially available under a trademark of Alliedchemical corp.) or a ferrite which is formed in a square manner.

It is possible to use a thermoplastic plastic member having a desirable formability or a thermoplastic plastic having a desirable heat resistance for a plastic in a composite member. For the above soft magnetic metal powder, an atomized powder such as a carbonyl iron powder and an iron-Permalloy, and a reduced iron powder etc. can be used. On the other hand, for a soft magnetic metal flake, a flake which is formed by molding a powder which is crushed by a ball-end mill etc. and flattening the powder mechanically and a flake which is formed by colliding a melt grain of iron or a cobalt amorphous alloy to a water-cooled copper are used.

Also, if the first magnetic core member 113 is formed by a composite member, it is possible to form the first magnetic core member 113 by performing an injection molding operation or a compressing molding operation of the composite member. The first magnetic core member 113 which is formed in this way is rigid with compared to a magnetic core member which is formed by a fragile ferrite. Therefore, it is hardly broken even if it is thin. Also, a powder or a flake which is formed by a soft magnetic metal member, an amorphous or ferrite is dispersed in a plastic so as to be insulated by the plastic with each other. Therefore, it is not conductive entirely. Thus, it is possible to obtain the first magnetic core member 113 which does not generate an eddy current even if it receives a high frequency radio wave. Here, it is preferable to form the first magnetic core member 113 as thin as possible which occupies a most of it section in a thickness direction of the antenna coil 10 as thin as possible. More specifically, in a case in which a sheet first magnetic core member 113 is used, it is preferable that the thickness of the sheet which forms the first magnetic core member 113 should be 0.01 to 1 mm. More preferably, it should be 0.05 to 1 mm. Also, if a thin sheet is formed in this way, it is possible to adjust its thickness by forming the first magnetic core member 113 by layering a plurality of sheets.

For a first magnetic core member 113 which is shown in FIGS. 4 and 5, a sheet member which is formed by injected a composite member in a square manner is used. The first magnetic core member 113 is bonded on a back surface of the electrically insulating member 111. The first magnetic core member 113 is bonded to the electrically insulating member 111 by applying a bond to at least the first magnetic core member 113 or the electrically insulating member 111 and putting the first magnetic core member 113 onto the electrically insulating member 111. In such a case, the first magnetic core member 113 is bonded onto a back surface of the electrically insulating member 11 so as to cover the returning sections 112b from a back of the electrically insulating member 111 without overlapping the forwarding sections 112a.

In this embodiment, as shown in FIG. 4, the sheet or plate conductive member 116 is layered so as to be bonded on a back surface of the electrically insulating member 111 so as to cover the first magnetic core member 113. The first magnetic core member 113 is formed by a conductive member such as a copper or an aluminum. If the first magnetic core member 113 has a conductivity, the conductive member 116 is layered so as to be bonded such that an insulating film should be disposed therebetween. It is preferable that the thickness of the conductive member 116 should be 0.01 to 5 mm. By forming the conductive member 116 with a thickness 0.01 to 5 mm, the interval between the conductive member 116 and the conductive member 112 increases; thus, it is possible to improve the characteristics of the antenna coil by improving the Q value in the conductive member 112. Also, it is preferable that an electric resistance in an area of 1 cm width and 1 cm length in the conductive member 116 should be 5Ω or less.

The thickness of the antenna coil 10 which is formed in this way can be very thin. Also, because of the thin thickness, even if the antenna coil is attached to the article 18, it hardly occurs that the antenna coil 10 protrude from the article 18. Also, the first magnetic core member 113 is bonded on a back surface of the electrically insulating member 111, the magnetic flux which is generated by an electric current which passes in the conductive member 112 passes through the first magnetic core member 113 such that a loop can be formed as indicated by a true-line arrow in FIG. 4. Also, the first magnetic core member 113 is bonded on a back surface of the electrically insulating member 111 so as to cover the returning sections 112b from a back surface of the electrically insulating member 111 without overlapping the forwarding sections 112a. Therefore, as shown by a dotted-line arrow in FIG. 4 in an enlarged manner, a part of the magnetic flux which passes through the first magnetic core member 113 is dispersed on its end section so as to pass above the forwarding sections 112a so as to return to the neighboring first magnetic core member 113.

Therefore, even if the tag antenna coil 10 is attached on a surface of the article 18, its magnetic flux direction is parallel with a surface of the article 18 as indicated by an arrow shown in FIG. 4; therefore, it hardly occurs that the magnetic flux passes through the article 18. Therefore, even if the article 18 is formed by a metal member, an eddy current which is generated in the article 18 is restricted; thus, the resonation frequency of the antenna coil 10 is not affected by the above metal article. Thus, the antenna coil 10 is operated reliably. In particular, in this embodiment, the conductive member 116 is layered so as to be bonded on a back surface of the electrically insulating member 111 so as to cover the first magnetic core member 113; therefore, its conductive member 16 is disposed between the first magnetic core member 113 and the article 18. Therefore, the magnetic flux which passes through the first magnetic core member 113 so as to disperse from its end section and pass above the forwarding sections 112a increases; thus, the antenna coil 10 is operated reliably.

Here, in the above embodiment, explanations are made for the first magnetic core member 113 which is formed by a soft magnetic metal member, a composite member, or a plate, a film made of the soft magnetic metal member, an amorphous film or its layered member, or a ferrite. However, it is acceptable if the first magnetic core member 113 may comprise an insulating resin film or sheet which are not shown in the drawing and a magnetic coating which is formed on a surface of an insulating resin film or a sheet. Here, it is preferable that the thickness of the insulating resin film or a sheet is 10 to 100 μm when the magnetic coating is formed. More preferably, it should be 20 to 40 μm. The magnetic core member which is formed by a magnetic coating which is formed on a surface of the insulating resin film or sheet is formed by applying and drying a paint which contains a powder or a flake which is formed by a magnetic member on a surface of the insulating resin film or sheet. Also, it is possible to obtain the first magnetic core member 113 having 0.8 mm thickness or thinner which has been difficult to form in an injection molding operation. Thus, it is possible to obtain a thinner antenna coil.

Figure 6:
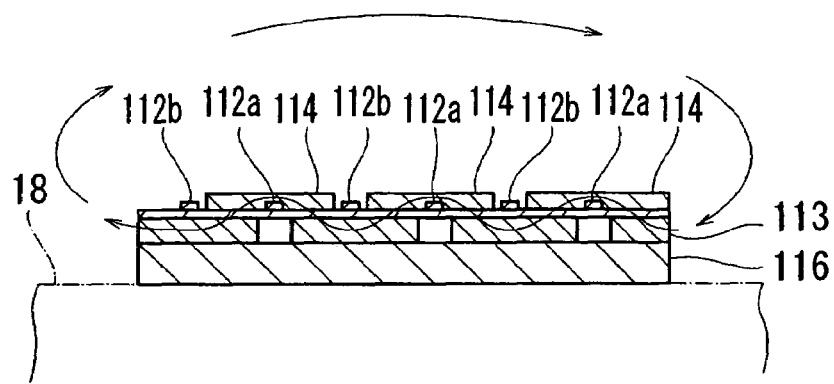
FIG. 6 is a cross section which corresponds to the FIG. 4 in which an antenna coil according to a fourth embodiment of the present patent application is shown.
Figure 7:
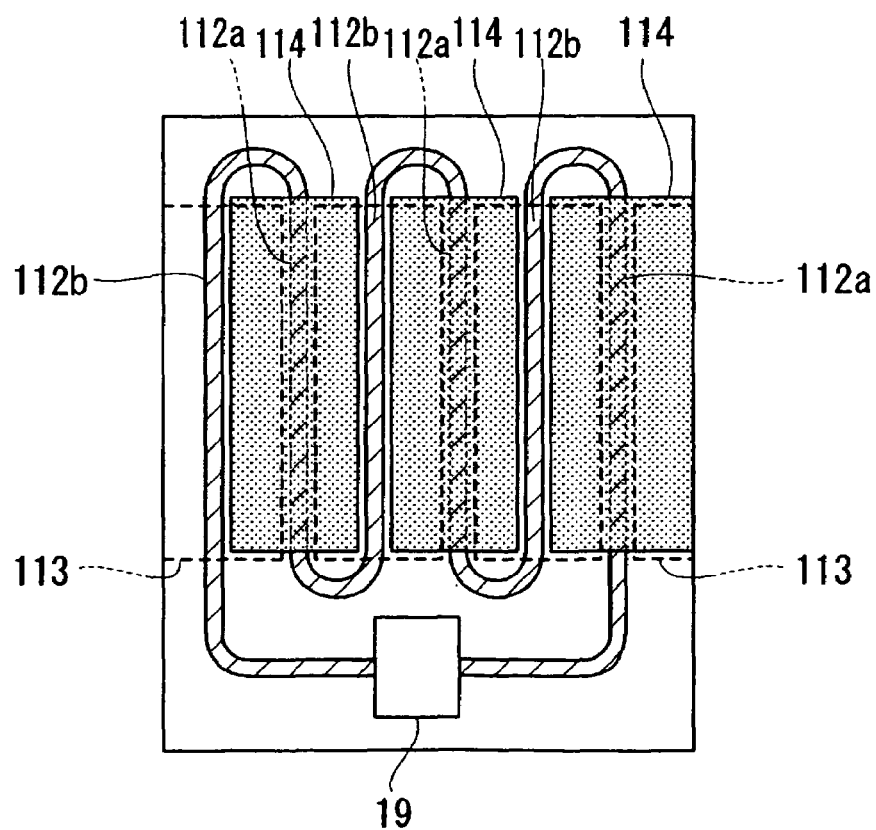
FIG. 7 is a plan view for an antenna coil.

Next, a third embodiment of the present invention is shown in FIGS. 6 and 7. Hereinafter, the same reference numerals are applied to corresponding members as shown in the above embodiment so as to omit the repeated explanation thereof.

In the present embodiment, a second magnetic core member 114 covers the forwarding section 112a so as not to overlap the returning section 112b on the surface of the insulating member 111 such that its end section overlaps the end section of the neighboring first magnetic core member 113. The second magnetic core member 114 in the present embodiment is formed by a magnetic coating which is formed by applying and drying a paint which contains a powder or a flake which is made of a magnetic member. That is, the paint which contains a powder or a flake which is formed by a magnetic member is applied on a surface of the electrically insulating member 111 so as to cover the forwarding sections 112a without covering the returning sections 112b; thus, a magnetic coating which forms the second magnetic core member 114 is formed by drying afterwards.

Here, for a powder for a magnetic member which is contained in a paint, an atomized powder can be used such as a carbonyl iron powder, an iron-Permalloy powder, and a reduced iron powder. On the other hand, for a flake which is formed by crushing the above powder by a ball end mill etc. and flattening the powder mechanically can be used. Also, a flake which is formed by colliding a melt alloy grain of an iron or cobalt amorphous alloy onto a surface of a copper which is cooled by a water can be used. Also, the thickness of the formed magnetic coating is preferably 10 to 800 μm. More preferably, it should be 30 to 300 μm. Here, if it is not possible to obtain a predetermined thickness in a single applying operation for a paint, it is possible to obtain a desirable thickness of coating by applying and drying the same paint repeatedly. It is possible to obtain a relatively thin magnetic core member 114 which is formed by a magnetic coating by a simple operation in which a paint is applied and dried.

In the antenna coil which is formed in this way, the magnetic core member 114 is formed by a magnetic coating; therefore, it is possible to obtain the magnetic core member 114 having 0.8 mm or thinner thickness which is difficult to form in the injection molding operation. Therefore, the thickness can be thin. Also, the magnetic core member 114 is bonded on a surface of the insulating member 111 so as to cover the forwarding sections 112a and overlap the end sections of the first magnetic core member 113 which neighbors the end sections. Therefore, the magnetic flux which passes through the first magnetic core member 113 moves to the magnetic core member 114 in the end sections of the first magnetic core member 113 so as to pass above the forwarding sections 112a as shown by a true-line arrow in FIG. 6. The magnetic flux moves to the end sections in the neighboring first magnetic core member 113 from the end section s of the magnetic core member 114. Therefore, the magnetic core member 114 introduces the magnetic flux which passes through the first magnetic core member 113 to a surface of the insulating member 111 in the forwarding sections 112a. The magnetic flux passes through the first magnetic core member 113 and the magnetic core member 114 while moving the first magnetic core member 113 and the magnetic core member 114. Therefore, the forwarding sections 112a and the returning sections 112b exist on a top surface and a back surface of the magnetic flux alternatively. Therefore, the continuous conductive member 112 which includes the forwarding sections 112a and the returning sections 112b is unified with the antenna coil which is wound around the magnetic flux. Therefore, it is possible to obtain an antenna coil 10 relatively easily which has the same characteristics as the characteristics of the conventional antenna coil in which a first conductive member is produced by winding a lead wire around an outer surface of the magnetic core member. Therefore, it is possible to improve the productivity in mass production with compared to a case of a conventional antenna coil in which a copper wire is wound.

Figure 8:
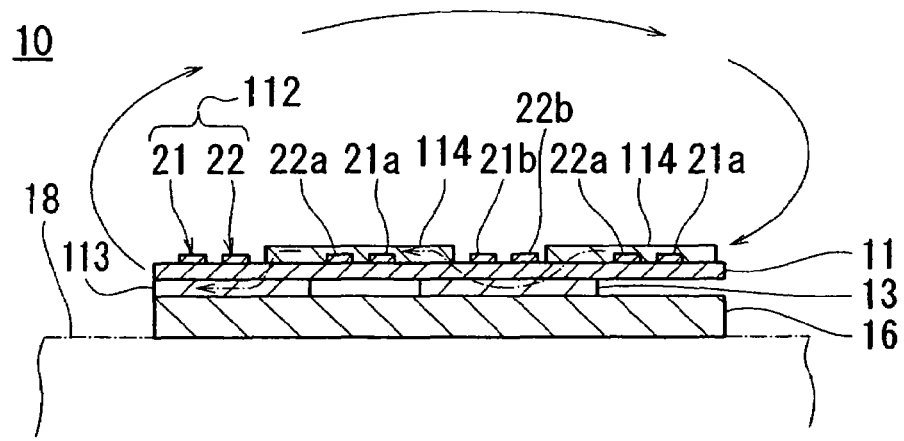
FIG. 8 is a cross section which corresponds to the FIG. 4 in which an antenna coil according to a third embodiment of the present patent application is shown.
Figure 9:
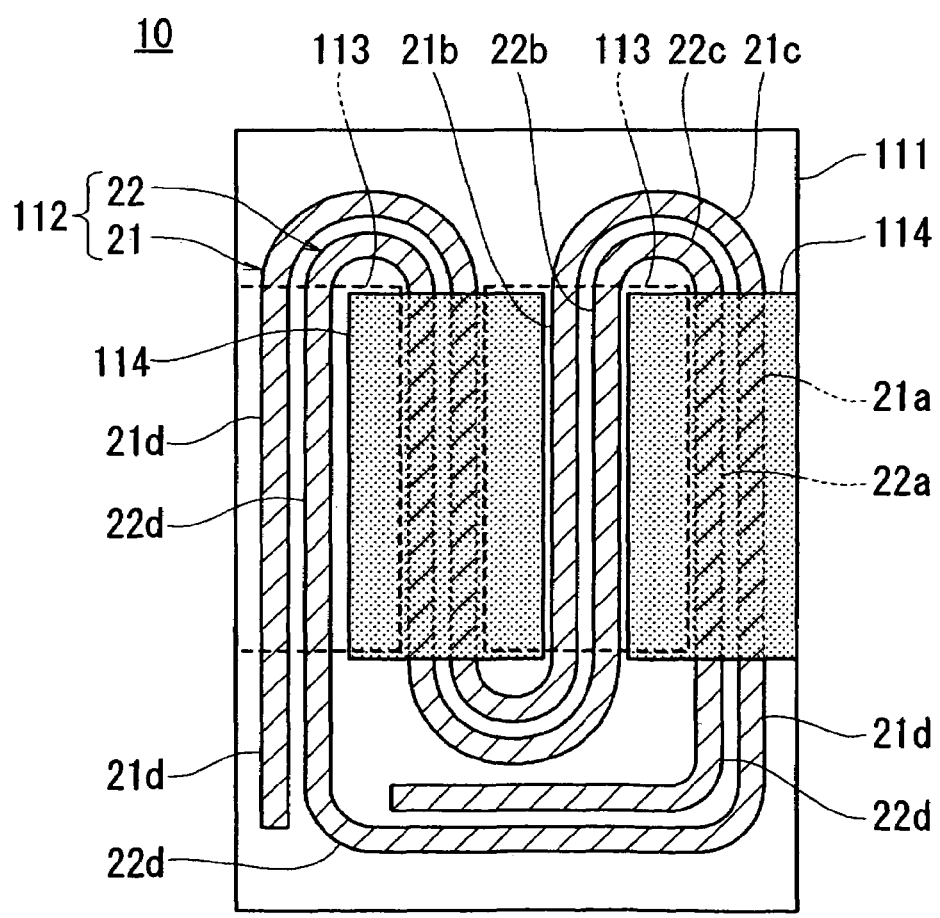
FIG. 9 is a plan view for an antenna coil.

Next, a fourth embodiment of the present invention as shown in FIGS. 8 and 9. Hereinafter, the same reference numerals are applied to corresponding members as shown in the above embodiment so as to omit the repeated explanation thereof.

In the present embodiment, the continuous conductive member 112 has two lead wires 21, 22. The lead wires 21, 22 are formed so as to wind on a surface of the insulating member 111 with predetermine intervals along with each other respectively. Forwarding sections 21a, 22a and returning sections 21b, 22b are formed alternatively in two lead wires 21, 22. The forwarding sections 21a, 22a and the returning sections 21b, 22b are connected alternatively by a plurality of connecting sections 21c, 22c. Lead sections 21d, 22d are formed on both ends of the two lead wires 21, 22 respectively. The continuous conductive member 112 is formed by connecting the lead section 21*d* in the end section of a lead wire 21 to a lead section 22*d* in a starting end section of the other neighboring insulating member 111.

Consequently, the first magnetic core member 113 is bonded on a back surface of the electrically insulating member 111 so as to cover the returning sections 21*b*, 22*b* from a back surface of the electrically insulating member 111 without overlapping the forwarding sections 21*a*, 22*a*. The second magnetic core member 114 is bonded on a surface of the electrically insulating member 111 so as to cover the forwarding sections 21*a*, 22*a* and overlap the end sections of the first magnetic core member 113 to which the end sections of the second magnetic core member 114 neighbors without overlapping the returning sections 21*b*, 22*b*.

In the antenna coil 10 which is formed in this way, the conductive member 112 is formed by two lead wires 21, 22. Therefore, the quantity of the forwarding sections 21*a*, 22*a* and returning sections 21*b*, 22*b* which exist on a top surface and a back surface of the magnetic flux alternatively which passes through the first magnetic core member 113 and the second magnetic core member 114 increases with compared to a case in which a conductive member is formed by a single conductive wire. Therefore, the turning number increases. Thus, it is possible to improve the characteristics of the antenna coil by increasing the turning number.

Figure 10:
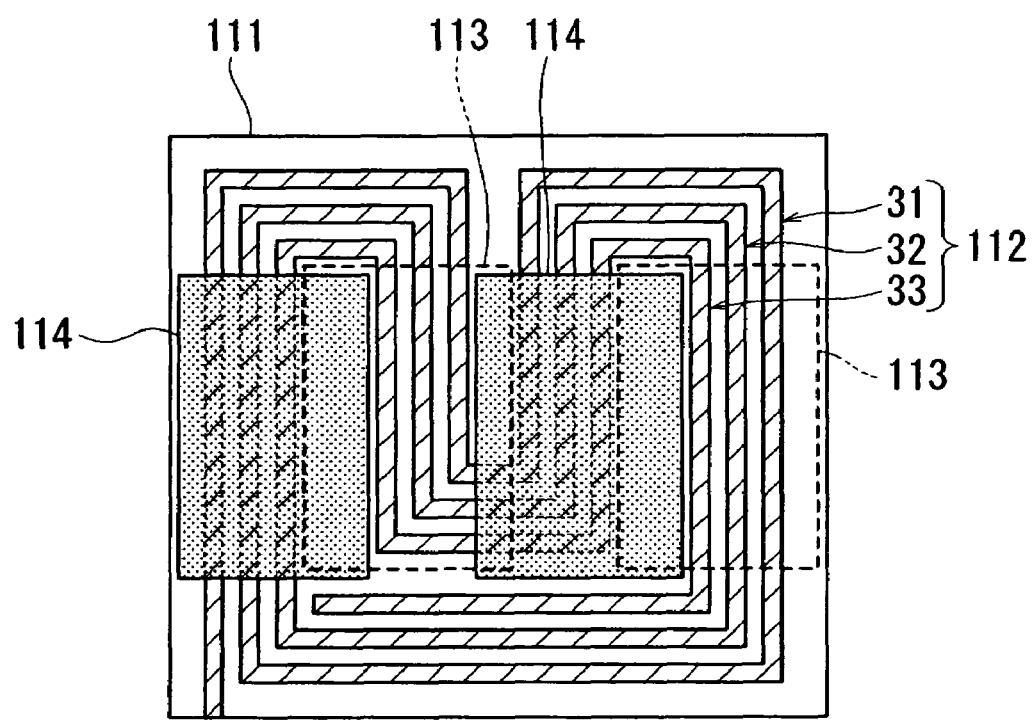
FIG. 10 is a plan view for an antenna coil which has a conductive member which comprises three conductive lead wires.

Here, in the above third embodiment as explained above, explanations are made for a case in which the conductive member 112 is formed by the two lead wires 21, 22. As shown in FIG. 10, it is acceptable if the conductive member 112 is formed by three lead wires 31, 32, 33. Also, it is acceptable if the conductive member 112 is formed by several pieces such as 4, 5, 6, 7, or 9 pieces of lead wires which are not shown in the drawing. If the turning number is increased, a so called turning number increases; therefore, it is possible to improve the characteristics of the antenna coil by increasing the turning number.

Also, in the above embodiments, explanations are made for the first magnetic core member 113 which is made by injecting a composite member into a mold and the second magnetic core member 114 which is made by a magnetic coating. It is acceptable if the first magnetic core member is made by a magnetic coating. It is acceptable if the second magnetic core member is made by a soft magnetic metal member, a powder of a flake which is made by an amorphous or a ferrite and a plastic composite member, a plate or a film which is made of a soft magnetic metal member, an amorphous film or its layered member, or a ferrite.

Next, an example of the present invention is explained in detail together with comparative examples.

EXAMPLE 3

As shown in FIGS. 4 and 5, a conductive member 112 is formed on a surface of the electrically insulating member 111 which is formed by an electrically insulating film. For the electrically insulating film, a polyimide film is used which has a dimension such as 50 μm thickness, and longitude and a latitude such as 65 mm×55 mm. A copper film having 35 μm is layered and bonded on a main surface of the polyimide film. A continuous conductive member 112*a* is formed on a surface of the polyimide film by etching the copper film such that the conductive member 112 has three winding forwarding sections 112*a* and three winding returning sections 112*b* both of which has 40 mm length are formed on a surface of the polyimide film alternatively with an interval of 10 mm. The conductive member 112 has 0.8 mm width.

After that, the first magnetic core member 113 having a dimension such as 1 mm thickness and longitude and a latitude such as 40 mm×20 mm is bonded on a back surface of the conductive member 112 on which the conductive member 112 is disposed. For the first magnetic core member 113, a member is used which is formed by injecting the composite member containing 92 weight % of a carbonyl iron powder and a nylon resin into a mold. The first magnetic core member 113 is bonded such that the first magnetic core member 113 should cover the returning sections 112*b* from a back surface of the electrically insulating member 111 without overlapping the forwarding sections 112*a*.

Consequently, the conductive member 116 which is formed by an aluminum plate having a dimension such as 0.1 mm thickness and longitude and a latitude such as 70 mm×60 mm is bonded on a back surface of the electrically insulating member 111 so as to cover the first magnetic core member 113. Thus, an example 1 is an antenna coil which has only the first magnetic core member 113 in this way.

EXAMPLE 4

An antenna coil which has only the same first magnetic core member 113 as that in the example 3 is obtained. The second magnetic core member 114 which as the same shape and size as the first magnetic core member of the example 1 is prepared by a composite member which is the same as that in the example 1. Consequently, an antenna coil shown in FIGS. 6 and 7 is obtained by bonding the second magnetic core member 114 on a surface of the electrically insulating member 111 so as to cover the forwarding sections 112*a* and overlap the end sections of the first magnetic core member 113 which neighbors the end sections without overlapping the returning sections 112*b*. In this way, an example 4 is an antenna coil which has both the first magnetic core member 113 and the second magnetic core member-114.

COMPARATIVE EXAMPLE 2

Figure 24:
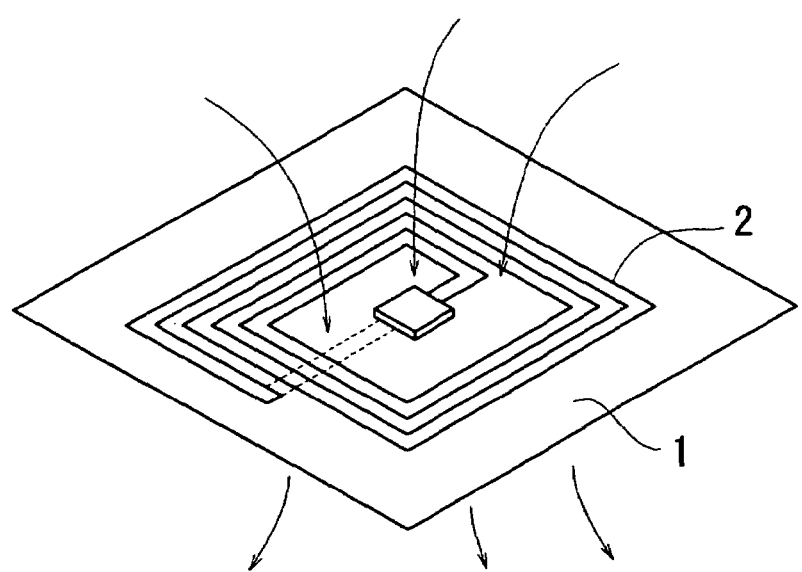
FIG. 24 is an isometric view for showing a conventional antenna coil which comprises a helical coil section.

A coil main body 2 is formed on an electrically insulating film as a single base plate 1 as shown in FIG. 24. For an electrically insulating film 1, a polyimide film is used which has a dimension such as 50 μm thickness, and longitude and a latitude such as 50 mm. A copper film having 35 μm thickness is layered and bonded on a surface of the polyimide film 1. By etching the copper film, a conductive member is formed. Thus, a coil main body 2 is formed by winding the conductive member helically four times around a main surface of the polyimide film. The conductive member is formed so as to have 0.8 mm thickness. An outer shape of the coil main body 2 which is formed by the conductive member is 45 mm×45 mm. The central section which is surrounded by the coil main body 2 is formed so as to be square of 37 mm×37 mm. Consequently, a conductive member which is not shown in drawing is formed by an aluminum plate having a dimension such as 0.1 mm thickness and longitude and a latitude such as 70 mm×60 mm so as to be bonded on a back surface of the base plate 1 which is made of an electrically insulating film. An example 2 is an antenna coil in which a helical coil main body 2 is formed around the base plate 1 which is made of an electrically insulating film.

COMPARATIVE EXAMPLE

For an article, an acrylic plate having a dimension such as 0.116 mm thickness and 100 mm×100 mm, and an aluminum plate having the same shape and size as the acrylic plate, and a soft steel plate are prepared respectively. Antenna coils according to the above example 1, 2 and a comparative example 1 are disposed on surfaces of the acrylic-plate, an aluminum plate, and a soft steel plate respectively. The antenna coils are disposed such that their conductive member should contact the articles directly. Consequently, measurement terminals in a measurement device (Model 4395 commercially available under trade mark which is registered by HEWLETT PACKARD) for measuring characteristics in a coil are connected to both ends of the conductive member 12 of these antenna coils. Thus, L value and Q value are measured respectively by the measurement device.

Also, condensers 116 are connected to the antenna coils in the comparative example 2 and the example 3 so as to obtain an EAS tag which is operable at 8.2 MHz. It is confirmed whether or not the tags are operated if the tags are disposed on surfaces of the acrylic plate, the aluminum plate, and the soft steel plate respectively. The result is shown in a TABLE 2 respectively.

TABLE 2

| Article | | Acrylic Plate | Aluminum Plate | Soft Steel Plate |
|---|---|---|---|---|
| Example 3 | L(μH) | 2.186 | 2.142 | 2.23 |
| | Q | 80.7 | 79.5 | 78.2 |
| | Confirmation of Operation | Operated | Operated | Operated |
| Example 4 | L(μH) | 2.662 | 2.635 | 2.71 |
| | Q | 76.5 | 74.8 | 73.5 |
| | Confirmation of Operation | Operated | Operated | Operated |
| Comparative Example 2 | L(μH) | 2.218 | 1.025 | 2.345 |
| | Q | 100.3 | 50.8 | 12.1 |
| | Confirmation of Operation | Operated | Not Operated | Not Operated |

As understood clearly from the TABLE 2, the L values do not substantially vary on the acrylic plate, the aluminum plate, and the soft steel plate in the examples 3 and 4. The Q values decreases not greatly on the aluminum plate and the soft steel plate with compared to a case of the acrylic plate. However, in the example 2, the L value varies on the aluminum plate with compared to the acrylic plate. Also, the Q value decreases greatly in a case of the soft steel plate. It is estimated that this is caused because the direction of the magnetic flux is orthogonal to a surface on the plate in the examples such that the most of the part of the magnetic flux reaches to the plate even if the conductive member is bonded in contrast to cases of the examples 3 and 4 in which the direction of the magnetic flux which is generated from the coil is parallel with a surface of the plate. Also, the tag in which the IC chip is connected to the antenna coils of the example 3 and the example 4 is operable on any surfaces of the acrylic plate, the aluminum plate, and the soft steel plate. In contrast, the tag in which the IC chip is connected to the antenna coil of the comparative example 2 is operable only when it is disposed on a surface of the acrylic plate. The tag in which the IC chip is connected to the antenna coil of the comparative example 2 is not operated when it is disposed on a surface of the aluminum plate and the soft steel plate. It is estimated that this is because the L value varies on the aluminum plate; thus, the resonation frequency varies and the energy is absorbed by a steel plate; thus, a loss is generated.

Next, a fifth embodiment of the present invention is explained based on the drawings.

Figure 11:
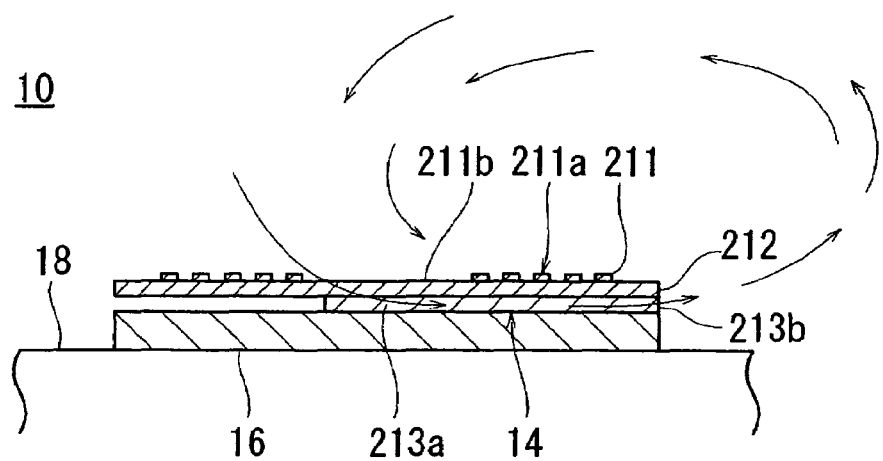
FIG. 11 is a cross section viewed in a line A—A shown in FIG. 12 which shows an antenna coil according to a fifth embodiment of the present patent application.
Figure 12:
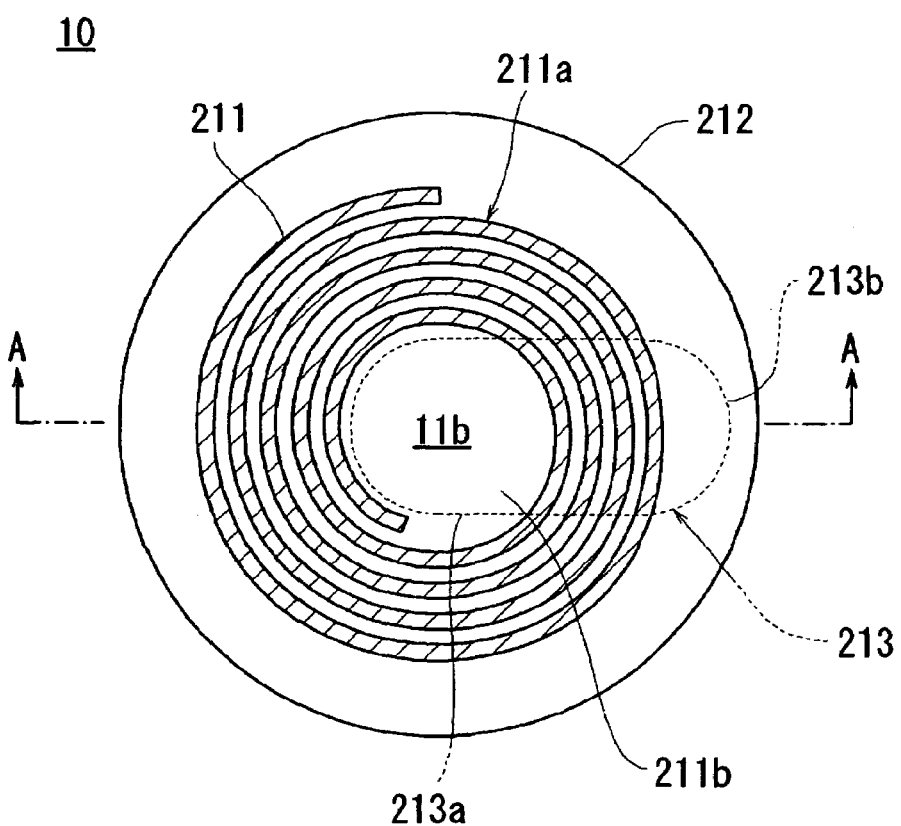
FIG. 12 is a plan view for an antenna coil.

As shown in FIGS. 11 and 12, the tag antenna coil 10 of the present invention comprises a coil main body 211a which is made by a conductive member 211 which is wound helically in a plate or plane and a sheet magnetic core member 213 which is bonded on a surface of the coil main body 211a. The coil main body 211a in the present embodiment is formed by winding the conductive member 211 helically around a main surface of the electrically insulating film or the sheet 212. A film or a sheet 212 such as a polyethylene terephthalate or a polyimide is used for the electrically insulating film or a sheet 212. The conductive member 211 can be formed if a conductive film which is bonded on a main surface of the electrically insulating film or the sheet 212 is etched or punched in a predetermined pattern. Also, the conductive member 211 can be formed if a conductive film which is bonded on a main surface of the electrically insulating film or the sheet 212 is printed by a screen-printing method or a vapor deposition method.

Processes for forming the conductive member 211 on the film 212 by the etching operation is explained. First, a member which is formed by attaching a copper film onto an entire main surface of the film 212 is prepared. An anti-etching paint is printed onto the copper film by a silk-screen method. The anti-etching paint is printed onto the copper film helically from a center in a rectangular manner or circular manner because it is necessary to form the coil main body 211a by the conductive coil member 211. After that, the copper film on which the anti-etching paint is not applied is removed in the etching operation after drying the anti-etching paint. The copper film area on which an anti-etching paint is applied remains on a main surface of the film. After that, by removing the anti-etching paint from the copper film, the conductive member 211 which is formed by the copper film which remains on a main surface of the film 212 is formed. Here, the anti-etching paint on a main surface of the film 212 in FIGS. 11 and 12 is applied helically and circularly from the center; therefore, the conductive member 211 which is formed on a main surface of the film 212 has a coil main body 211a which is formed helically from the center in a circular manner. By the etching operation, it is possible to form the conductive member 211 on a main surface of the electrically insulating film 212 or the electrically insulating sheet relatively easily and in low cost.

On the other hand, it is possible to form the magnetic core member 213 by a plate or sheet soft magnetic metal member, or a soft magnetic metal member, a powder or a flake which is formed by an amorphous or ferrite, or composite member of plastic. Also, it is acceptable if the magnetic core member 213 is formed by an amorphous film or its layered member such as an Fe amorphous alloy (METGLAS 2605-2 commercially available under a trademark of Alliedchemical corp.) and a Co amorphous alloy (METGLAS 2712A commercially available under a trademark of Alliedchemical corp.) or a ferrite which is formed in a square manner.

Explanations for the plastic which is used for the composite member is omitted because it is the same as that in the first embodiment.

A sheet member which is formed by injecting the composite member into an oval circular manner into a mold is used for the magnetic core member 213 in FIGS. 11 and 12. This magnetic core member 213 is bonded on another main surface of the electrically insulating film 212. The magnetic core member 213 is bonded on another main surface of the electrically insulating film 212 by applying a bond on either one or both of the magnetic core member 213 and the electrically insulating film 212, and after that, layering the magnetic core member 213 on another main surface of the electrically insulating film 212. Such a layering operation and bonding operation are performed such that the magnetic core member 213 crosses a part of the coil main body 211a in such a way that an end 213a of the magnetic core member 213 is positioned in a central section 211b which is surrounded by the coil main body 211a and an other end 213b of the magnetic core member 213 is positioned outside of the coil main body 211a.

As shown in FIG. 11, in the antenna coil 1 in the present embodiment, a conductive member 216 in a sheet or a plate manner is bonded on a surface of the coil main body 211a. Specifically, the conductive member 216 is bonded on another main surface of the electrically insulating film or the sheet 212 so as to cover the magnetic core member 213 which is bonded on another main surface of the electrically insulating film or a sheet 212. The conductive member 216 is formed by a conductive material such as a copper, or an aluminum. In a case in which the magnetic core member 213 has a conductivity, it is layered and bonded so as to have an insulating film therebetween. It is preferable that the thickness of the conductive-member 216 is 0.01 mm to 5 mm. By forming the conductive member 216 with a thickness 0.01 mm to 5 mm, an interval between the conductive member 216 and the conductive member 211 in creases. Thus, it is possible to improve the Q value of the coil main body 211a which is formed by the conductive member 211; therefore, it is possible to improve the performance of the antenna coil 10. Also, it is preferable that an electric resistance of the conductive member 216 in 1 cm width and 1 cm length is 5Ω or less.

In such an antenna coil 10 which is formed in this way, it is possible to form its thickness very thin. Also, because of such a thin thickness, the antenna 10 does not actually protrude from the article 18 even if the antenna coil 10 is attached to the article 18. Also, the magnetic core member 213 is layered on a surface of the coil main body 211a while crossing a part of the coil main body 211a; therefore, the magnetic flux which is generated by an electric current which passes to the coil main body 211a which is formed by the conductive coil member 211 passes through the magnetic core member 213. The magnetic flux which passes through the magnetic core member 213 describes a loop which is shown by a true-line arrow in FIG. 11. Because of this, even if the tag antenna coil 10 is attached to a surface of the article 18, its magnetic flux direction is parallel with a surface of the article 18 as indicated by an arrow in FIG. 11. Even if the article 18 is formed by a metal member, an eddy current which is generated in the article 18 is restricted; thus, the resonation frequency in the antenna coil 10 is not affected by the metal article. Thus, the antenna coil 10 is operated reliably.

In particular, in the present embodiment, the coil main body 211a is formed by etching the conductive film which is bonded on an entire main surface of the electrically insulating film 212 in a predetermined pattern; therefore, it is possible to obtain the RFID tag or an EAS tag relatively easily only by connecting the electrically insulating film 212 on which the IC chip or a resonation condenser which are not shown in the drawing is mounted to the coil main body 211a. Also, in the RFID tag in which the IC chip is connected to the antenna coil 10, the antenna coil 10 is attached to the article 18 such that the conductive member 216 should be disposed between the article 18 and the coil main body 211a. By doing this, the magnetic flux which is generated by an electric current which passes in the coil main body 211a passes mainly in the magnetic core member 213; thus, the magnetic flux does not pass in the article 18. Furthermore, in the present embodiment, the conductive member 216 is layered and boned on another main surface of the electrically insulating film or a sheet 212 so as to cover the magnetic core member 213; thus, the conductive member 216 blocks the radio wave which is directed to the article. Therefore, with no regard to whether or not the article 18 is formed by a metal member, the antenna coil 10 receives its fewer influence. Even if a surface of the article is made from a metal member, the loss due to the eddy current which is generated on the metal surface is not generated; thus, the RFID tag is operated reliably even if it is attached to a section which is formed by a metal member of the article 18.

Also, in the antenna coil 10, the coil main body 211a is formed by a continuous conductive member 211 on a main surface of the electrically insulating film or the sheet 212. Therefore, its usage is easy; thus, it is possible to obtain the antenna coil 10 only in a simple operation such as a layering and bonding operation of the magnetic core member 213 on another main surface of the electrically insulating film or the sheet 212. Therefore, it is possible to improve the productivity in mass production with compared to a case of a convention al antenna coil of which conductive member has been produced by winding a lead wire around an outer surface of the magnetic core member.

Here, in the above embodiment, explanations are made for the magnetic core member 213 which is formed by a soft magnetic metal member, a composite member, a plate or a film of a soft magnetic metal member, an amorphous film or its layered member, or a ferrite. It is acceptable if the magnetic core member 213 may be provided with an insulating resin film or a sheet and a magnetic coating which is formed on a surface of the insulating resin film or a sheet which are not shown in the drawing. Here, the thickness of the insulating resin film or sheet for forming the magnetic coating is preferably 10 to 100 μm. More preferably, it should be 20 to 40 μm. The magnetic core member which is formed by the insulating resin film or a sheet and a magnetic coating which is formed on a surface thereof is made b applying and drying a powder which is made of a magnetic member or a paint which includes a flake on a surface of the insulating resin film or the sheet. By doing this, it is possible to obtain the magnetic core member 213 having 0.8 mm thickness which has been difficult to produce in an injection molding operation; thus, it is possible to obtain further thinner antenna coil 10.

Figure 13:
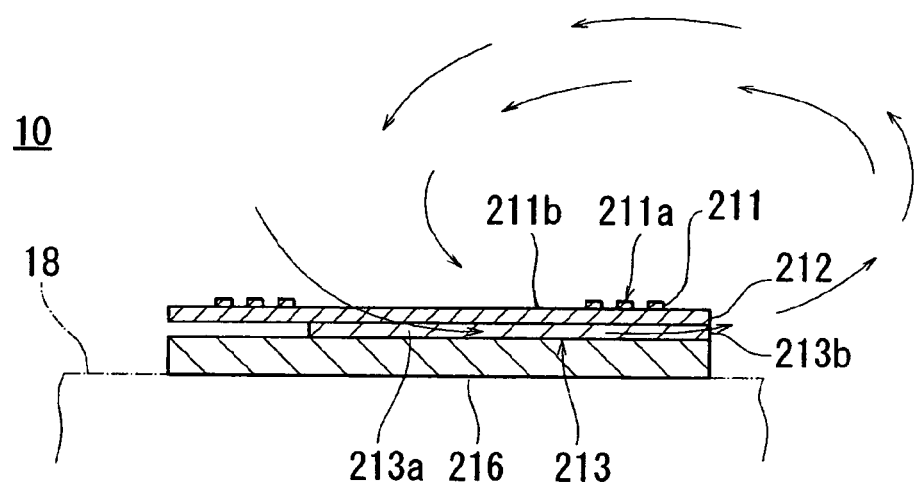
FIG. 13 is a cross section which corresponds to the FIG. 11 in which an antenna coil according to a sixth embodiment of the present patent application is shown.
Figure 14:
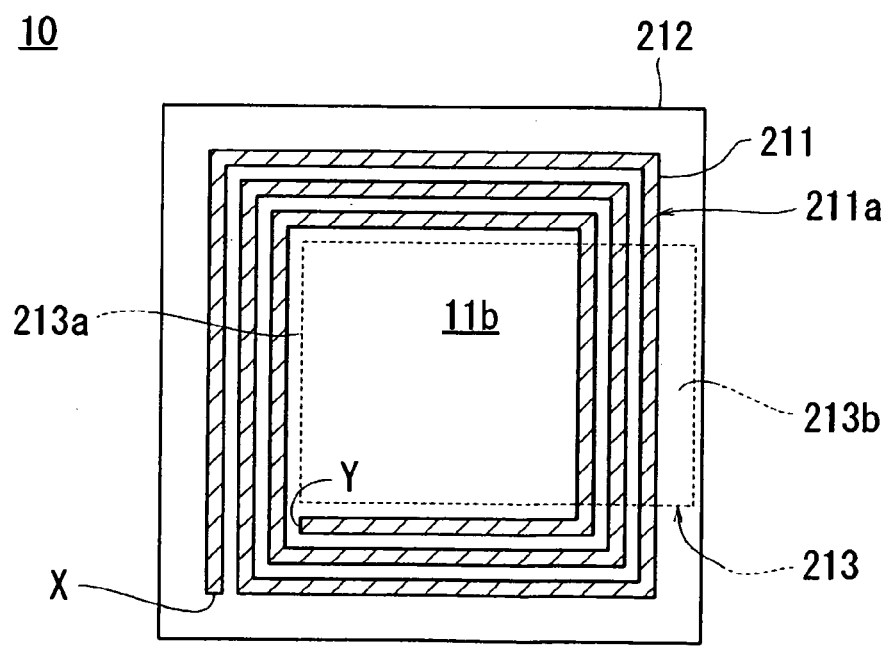
FIG. 14 is a plan view for an antenna coil.

Next, a sixth embodiment of the present invention is shown with reference to FIGS. 13 and 14. Hereinafter, the same reference numerals are applied to corresponding members as shown in the above embodiment so as to omit the repeated explanation thereof.

In the present embodiment, the coil main body 211a which is wound in a rectangular helical manner is formed on a main surface of the electrically insulating film 212 by the conductive member 11. In the present embodiment, the conductive coil member 211 is formed by performing the screen printing operation or a vapor deposition operation of the conductive member such as Cu, Al, Zn on a main surface of the electrically insulating film 212 in a rectangular helical manner. By forming the conductive coil member 211 on a main surface of the electrically insulating film 212 by performing the printing operation or the vapor deposition operation, it is possible to perform relatively large production by a relatively cheap cost.

A powder which is made of a magnetic member of a paint which includes a flake is applied on another main surface of the electrically insulating film 212 so as to cross a part of the coil main body 211a. The paint is applied such that an end 213a is positioned in a central section 211b which is surrounded by the coil main body 211a and another end 213b is positioned outside of the coil main body 211a. After that, by performing a drying operation, a magnetic coating which forms the magnetic core member 213 is formed. The magnetic core member 213 which is made of a magnetic coating which is formed in this way is layered on another main surface of the film or the sheet 212.

Here, for the powder which is included in the paint, an atomized powder such as a carbonyl iron powder and an iron-Permalloy, and a reduced iron powder etc. On the other hand, for a flake of the magnetic member, a flake which is formed by molding a powder which is crushed by a ball-end mill etc. and flattening the powder mechanically and a flake which is formed by colliding a melt grain of iron or a cobalt amorphous alloy to a water-cooled copper are used. Also, the thickness of the formed magnetic coating should be 10 to 800 μm. More preferably, it should be 30 to 300 μm. Here, if it is not possible to obtain a predetermined thickness in a single applying operation for a paint, it is possible to obtain a desirable thickness of coating by applying and drying the same paint repeatedly. The magnetic coating serves for the magnetic core member 213. It is possible to obtain the tag antenna coil 10 which has the magnetic core member 213 which is formed by a magnetic coating in a simple operation such as only applying and drying the paint.

The antenna coil which is formed in this way has the magnetic core member 213 which is made of a magnetic coating. Therefore, it is possible to obtain the magnetic core member 213 having 0.8 mm thickness or thinner which has been difficult to form in the injection molding operation. Thus, it is possible to obtain thinner thickness. Therefore, it is possible to obtain the antenna coil 10 of which magnetic flux direction is parallel with the surface of the article such that the antenna coil does not actually protrude from the article. Also, the magnetic core member 213 is formed a magnetic coating which is formed on the electrically insulating film 212 or a sheet; therefore, it is possible to omit a step for bonding the magnetic core member 213 in the above explained embodiment; thus, it is possible to obtain the antenna coil 10 in further simple operation. Also, it is possible to improve the productivity in the mass production for the antenna coil 10. Furthermore, the magnetic coating is formed by applying and drying the paint; thus, if a flake which is formed y the magnetic member is included in the paint, and if the flake is disposed in parallel with a surface of the electrically insulating film 212 or the sheet, it is possible to improve the characteristics of the magnetic core member 213.

Here, in the above explained embodiment, the coil main body is formed by winding a conductive member helically around a main surface of the electrically insulating film 212. However, it is not necessary to form the coil main body on the electrically insulating film as long as it is possible to maintain the conductive member so as to be wound helically in a plane. Specifically, it is acceptable if the coil main body is formed by a conductive member which is wound helically in a plane by winding a lead wire of which surface is coated by an insulating layer helically in a plane or by punching the conductive plate member such as an aluminum sheet or a copper plate.

Next, an example of the present invention is explained in detail with reference to a comparative example.

COMPARATIVE EXAMPLE 3

An air-core coil in which a coil main body is formed by a conductive member on a main surface of an electrically insulating film is obtained. For an electrically insulating film, a polyimide film having 50 μm and longitude and latitude such as 50 mm×60 mm is used. A copper film having 35 μm thickness is layered and bonded on a main surface of the polyimide film. A coil main body which is wound helically four times rectangularly is formed on a main surface of the polyimide film by a continuous conductive member by etching the copper film. The conductive member is formed to be 0.8 mm width. An outer shape of the coil main body which is formed by the conductive member is 18 mm×47 mm. A comparative example 1 is an antenna coil which is formed only by a conductive member which is disposed on the electrically insulating film.

EXAMPLE 5

An air-core coil is formed on an electrically insulating film which is the same as the electrically insulating film of the comparative example 3 by the same conductive member as that of the comparative example 1 by the process which is the same as the process in the comparative example 1. Also, an ink which contains a magnetic flake is prepared separately. The ink is applied and dried on another main surface of the electrically insulating film. The magnetic core member is formed on another main surface of the electrically insulating film which forms a surface of the coil main body such that, an end of the magnetic core member is positioned in a central section which is surrounded by the coil main body so as to cross a part of the coil main body, and another end of the coil main body is positioned outside of the coil main body. A comparative example 5 is an antenna coil which has a magnetic core member which is made of a magnetic coating on a surface of the coil main body in this way.

EXAMPLE 6

An air-core coil is formed on an electrically insulating film which is the same as the electrically insulating film of the comparative example 3 by the same conductive member as that of the comparative example 3 by the process which is the same as the process in the comparative example 3. Also, a magnetic core member is prepared which is made of a layered member of an amorphous films which are made by layering four pieces of amorphous films having 10 mm×60 mm of outer shape and 20 μm thickness separately. The magnetic core member is bonded on another main surface of the electrically insulating film; thus, an antenna coil which has a magnetic core member on a surface of the coil main body. The magnetic core member is bonded such that an end of the magnetic core member is positioned in a central section which is surrounded by the coil main body so as to cross a part of the coil main body, and another end of the coil main body is positioned outside of the coil main body. In this way, an example 6 is an antenna coil which has a magnetic core member which is formed by a layered member of the amorphous film on a surface of the coil main body.

EXAMPLE 7

An air-core coil is formed on an electrically insulating film which is the same as the electrically insulating film of the comparative example 3 by the same conductive member as that of the comparative example 3 by the process which is the same as the process in the comparative example 3. Also, a magnetic core member is prepared which is made of a composite member having 35 mm×52 mm of outer shape and 0.87 mm thickness separately. The composite member is made of a grain iron powder and a plastic as a soft magnetic metal member. The magnetic core member which is made of the composite member is bonded on another main surface of the electrically insulating film; thus, an antenna coil which has a magnetic core member on a main surface of the coil main body is obtained. The magnetic core member is bonded such that an end of the magnetic core member is positioned in a central section which is surrounded by the coil main body so as to cross a part of the coil main body, and another end of the coil main body is positioned outside of the coil main body. In this way, an example 7 is an antenna coil which has a magnetic core member which is formed by a composite member on a surface of the coil main body.

COMPARATIVE EXAMPLE

Measurement terminals in a measurement device (Model 4395 commercially available under trade mark which is registered by HEWLETT PACKARD) for measuring characteristics in a coil are connected to both ends of the conductive member (X and Y in FIG. 14) which forms the coil main body of the antenna coil according to the comparative example 3 and the examples 5 to 7. Thus, L value and Q value of the coil main boy in a predetermined frequency are measured respectively by the measurement device.

Also, for an article, an aluminum plate is prepared which has a dimension such as 100 mm×100 mm and thickness of 0.16 mm. IC chips are connected to both end sections (X and Y shown in FIG. 14) in the conductive member which forms the coil main bodies according to the comparative example 3 and the examples 5 to 7. A tag is formed by the IC chips and the antenna coil so as to be operable in 213.56 MHz. It is confirmed whether or not the tags are operated if the tags are disposed on surfaces of the aluminum plate respectively. The result is shown in a TABLE 3.

TABLE 3

| | Example 5 | | Example 6 | | Example 7 | | Comparative Example 3 | |
| | Magnetic Core Member | | | | | | | |
| Predetermined | Magnetic Coating | | Amorphous | | Composite Member | | No Magnetic Core Member | |
| Frequency (MHz) | L (µH) | Q | L (µH) | Q | L (µH) | Q | L (µH) | Q |
|---|---|---|---|---|---|---|---|---|
| 1 | 1.315 | 7.8 | 1.395 | 7.6 | 1.372 | 8.1 | 0.680 | 2.0 |
| 2 | 1.296 | 13.6 | 1.357 | 11.6 | 1.351 | 14.5 | 0.667 | 3.3 |
| 3 | 1.287 | 18.9 | 1.343 | 14.4 | 1.344 | 19.7 | 0.662 | 4.4 |
| 4 | 1.285 | 23.3 | 1.335 | 16.0 | 1.340 | 24.2 | 0.660 | 5.2 |
| 5 | 1.286 | 27.4 | 1.331 | 17.3 | 1.340 | 28.6 | 0.659 | 6.0 |
| 6 | 1.286 | 31.3 | 1.328 | 18.1 | 1.340 | 32.6 | 0.659 | 6.6 |
| 7 | 1.287 | 34.5 | 1.326 | 18.9 | 1.341 | 36.2 | 0.659 | 7.2 |
| 8 | 1.290 | 37.3 | 1.325 | 18.6 | 1.343 | 39.1 | 0.660 | 7.5 |
| 9 | 1.292 | 40.6 | 1.325 | 19.2 | 1.346 | 42.7 | 0.660 | 8.0 |
| 10 | 1.295 | 43.0 | 1.325 | 19.3 | 1.348 | 45.1 | 0.661 | 8.4 |
| 11 | 1.299 | 45.2 | 1.326 | 19.4 | 1.352 | 47.9 | 0.663 | 8.7 |
| 12 | 1.305 | 47.0 | 1.330 | 19.4 | 1.358 | 50.6 | 0.665 | 9.0 |
| 13 | 1.313 | 48.4 | 1.333 | 19.4 | 1.363 | 52.3 | 0.668 | 9.2 |
| 14 | 1.316 | 50.3 | 1.336 | 19.4 | 1.390 | 55.3 | 0.673 | 9.5 |
| 15 | 1.322 | 51.3 | 1.403 | 19.3 | 1.376 | 57.1 | 0.683 | 9.6 |
| 20 | 1.361 | 53.7 | 1.369 | 18.8 | 1.415 | 64.7 | 0.691 | 10.1 |
| Operation | Operated | | Operated | | Operated | | Not Operated | |

As clearly understood from the TABLE 3, the Q value is improved in the examples 5 to 7 with compared to the comparative example 3. It is estimated that this is caused by an existence of the magnetic core member. Also, the tags in which the IC chips are connected to the antenna coils of the examples 5 to 7 are operable even if the tags are disposed on the surface of the aluminum plate. In contrast, the tag in which the IC chips are connected to the antenna coil of the comparative example 3 is not operable. It is estimated that this is because the magnetic flux which is generated from the coil is parallel with a surface of the plate in the antenna coil of the examples 5 to 7; thus, the eddy current is restricted from being generated when the magnetic flux reaches to a surface of the aluminum plate. On the other hand, in the comparative example 3, the direction of the magnetic flux is orthogonal to a surface of the plate; thus, a most part of the magnetic flux reaches to the aluminum plate; therefore, the L value of the antenna coil varies and the resonation frequency varies, and the energy is absorbed in the iron plate so as to be a loss there.

Next, a seventh example of the present invention is explained with reference to drawings.

Figure 15:
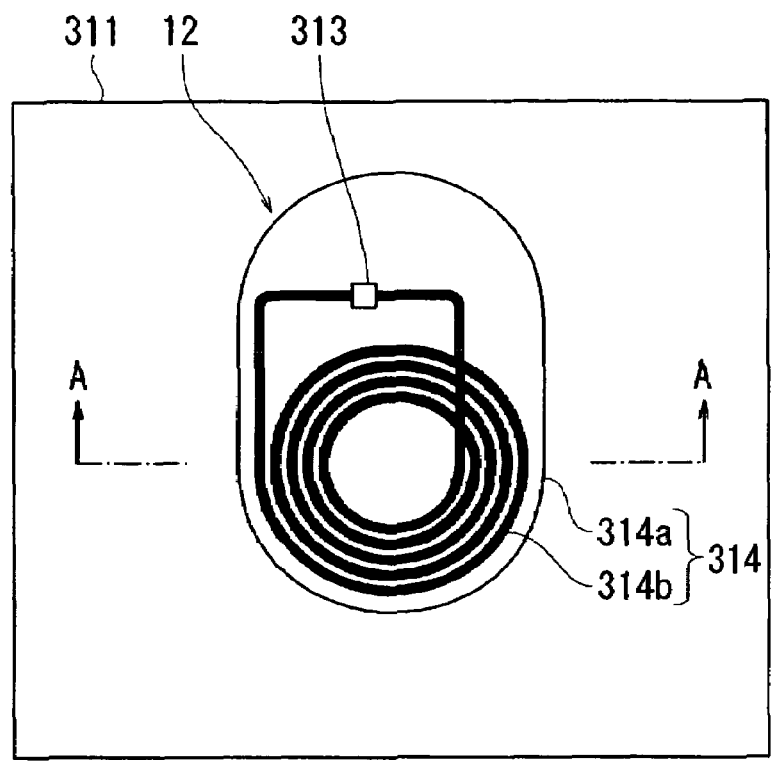
FIG. 15 is a plan view for a transponder which includes an antenna according to a seventh embodiment of the present invention.
Figure 16:
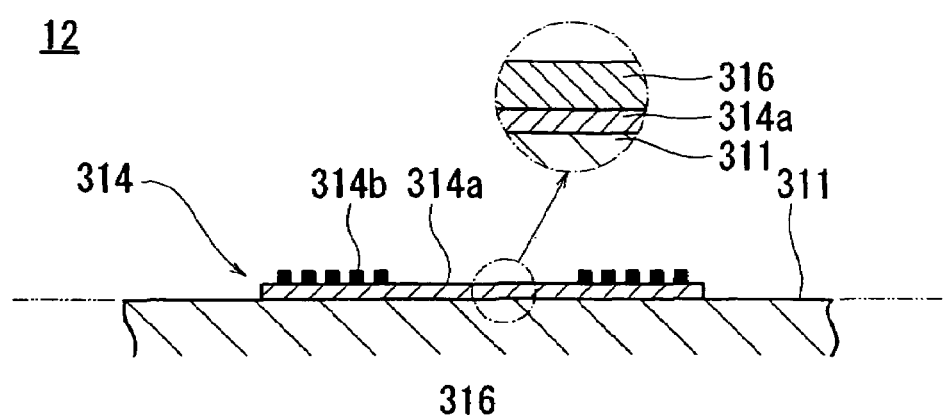
FIG. 16 is a cross section viewed in a line A—A in FIG. 15.

As shown in FIGS. 15 and 16, an RFID tag 12 as a transponder is attached on a surface of an article 311. The tag 12 comprises an IC chip 313 in which a different identical information per an article 313 is stored and a transponder antenna 314 which is connected to the IC chip 313 electrically. In the present embodiment, a most part of the IC chip 313 to which the transponder is attached is formed by a metal member. The antenna 314 of the present invention comprises a conductive member 314a of which back surface is attached to the article 11 so as to be in a plate manner by the conductive member and a coil main body 314b which is wound helically around a surface of the conductive member 314a via an insulating member 316.

For the conductive member 314a, it is possible to name a sheet, plate, or a film which are made of a conductive member such as a copper or an aluminum. A conductive member both ends of which are connected is acceptable. As shown in FIG. 16 in an enlarged manner, it is preferable that the insulating member 316 should be a non-conductive sheet, plate, or film such as a polyethylene, or a polyethylene terephthalate. Also, it is acceptable that the conductive member 314a may be a conductive coating which is formed by applying and drying a conductive ink on a back surface of the insulating member 316 as long as the conductive member 314a has a conductivity. It is preferable that the conductive coating is a member which contains a grain or a flake which are made of a silver or graphite. Furthermore, it is acceptable if the conductive member 314a may be a conductive plating layer or a vapor deposition layer which are layered on a back surface of the insulating member 316. In a case in which a conductive member 314a which is made of a paint, a plating layer, or a vapor deposition layer is used, it is preferable that a thickness of the insulating member 316 is 0.01 to 5 mm. By forming the insulating member 316 with a thickness of 0.01 to 5 mm, an interval between the conductive member 314a and the coil main body 314b increases; thus, it is possible to improve the performance of the antenna by improving the Q value in the coil main body 314b. Also, an electric resistance of the conductive member 314a per 1 cm width and 1 cm length should be is 5○ or less.

For the helical coil main body 314b, a member which has been used conventionally is used. That is, for the coil main body 314b, it is preferable that it is made by winding the coated lead wire. Alternatively, it is possible to name a method in which an unecessary part is removed from a conductive layer such as an aluminum film or a copper film according to an etching method or a punching method which are layered on an insulating plastic sheet which is a insulating member 316 so as to form a helical manner. If the conductive member 314a is formed by a coating, a plating layer, or a vapor deposition layer which are formed on a back surface of the insulating member 316, it is acceptable that a film such as an aluminum film is layered on a surface of the insulating member 316 directly, an unnecessary part of the aluminum film or the copper film is removed according to an etching method, a helical coil main body 314b is formed on its surface directly. The coil main body 314b is formed such that the turning number and the turning diameter are adjusted such that a predetermined characteristic value can be obtained under condition that the coil main body 314b is wound around a surface of the conductive member 314a. Here, in the present embodiment, it is understood that an IC chip 313 is bonded on the conductive member 314a directly under condition that it is connected to both ends of the coil main body 314b.

In the transponder antenna 314 which is formed in this way, its characteristics value varies usually if the coil main body 14 is fixed on the conductive member 314a. The coil main body 314b is adjusted so as to obtain a predetermined characteristic value under condition that the coil main body 314b is wound around a surface of the conductive member 314a. Therefore, by transmitting a radio wave which has a predetermined frequency from a transmitting/receiving antenna in an interrogator which is not shown in the drawing to the antenna 314, it is possible to activate the tag 12 reliably. Also, in the antenna 314, the coil main body 314b which actually receives the radio wave which has a predetermined frequency is wound around a surface of the conductive member 314a in advance; thus, a predetermined characteristics value is obtained. Therefore, even if the antenna 314 is attached to an article which is made of a metal member, it never occurs that the characteristics value of the coil main body 314b varies greatly. Therefore, a space which has been necessary for attaching the conventional antenna 314 onto a metal article is not necessary. Therefore, it is possible to avoid that the tag 12 protrudes from the article to a great extent and activate the tag 12 reliably without being affected undesirably from the metal article.

Figure 17:
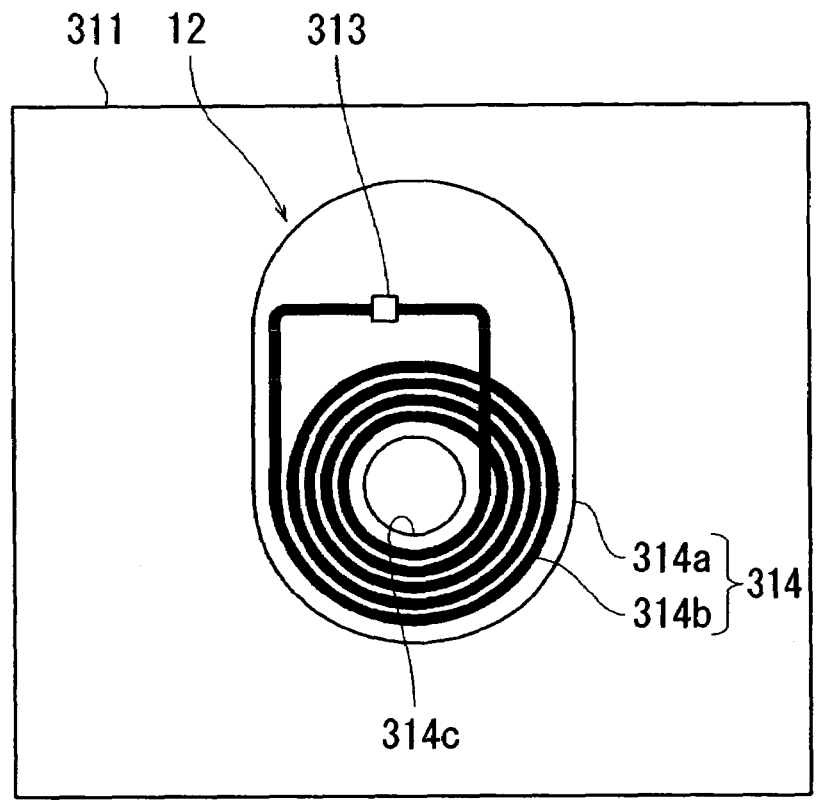
FIG. 17 is a plan view which corresponds to FIG. 15 which describes a transponder which includes an antenna in which a hole is formed in its conductive member.
Figure 18:
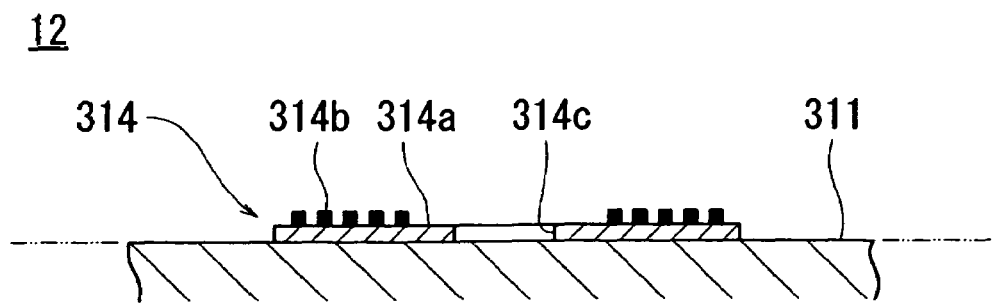
FIG. 18 is a cross section which corresponds to FIG. 16 which describes an antenna.

Here, if the Q value of the coil main body 314b decreases greatly, as shown in FIGS. 17 and 18, it is preferable to form a hole 314c in a section which is surrounded by the coil main body 314b in the conductive member 314a. In a case in which a hole 314c is formed in the conductive member 314a in a central section of the coil main body 314b, even if an eddy current is generated in the conductive member 14a by a radio wave which penetrates through the coil main body 314b, the eddy current is generated in a narrow area near the coil main body 314b due to an existence of the hole 314c; thus, it is possible to restrict the Q value from being reduced in the coil main body 314b. As a result, it is possible to attach the transponder antenna 314 directly without varying its characteristics even if a surface of an article is made from any material.

Figure 19:
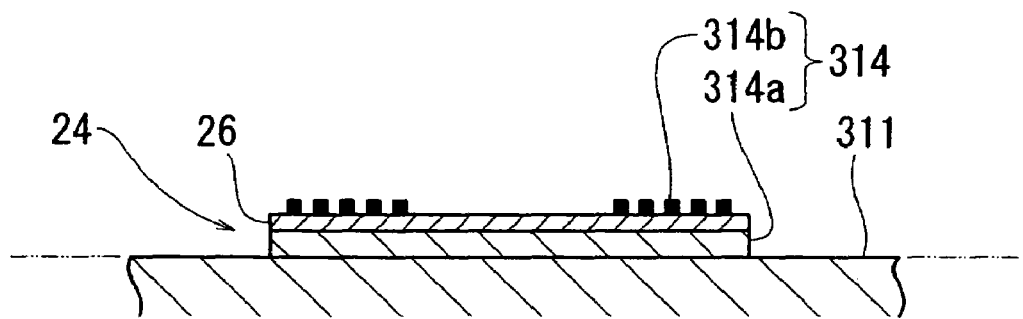
FIG. 19 is a cross section which corresponds to FIG. 16 which shows an antenna according to a second embodiment in which a soft magnetic member is disposed.

FIG. 19 shows an eighth embodiment of the present invention. In FIG. 19, the same reference numeral indicates the same reference numeral shown in FIGS. 15 and 16.

The present embodiment is a transponder antenna 24 in which a soft magnetic member 26 which is formed in a plate manner is disposed between the conductive member 314a in the antenna in the above explained first embodiment and the coil main body 314b. Here, explanations for the conductive member 314a and the coil main body 314b are omitted because those are the same as those in the above first embodiment.

It is preferable that the soft magnetic member 26 is formed by either one of the soft magnetic member such as an amorphous alloy, a Permalloy, an electromagnetic steel, a silicon steel, a sendust alloy, a quench solidified member for Fe—Al alloy or a soft magnetic ferrite, a casted member, a rolled strip member, a forged member, or a sintered member. Also, product of a transmission rate of the soft magnetic member 26 and a thickness represented in a unit such as mm indicates 0.5 or larger. Also, it is acceptable that the soft magnetic member 26 is a soft magnetic metal member, a composite which includes a powder or a flake which is formed by a soft magnetic metal member or a soft magnetic ferrite, or a coating which includes a powder or a flake which is formed by a soft magnetic metal member or a soft magnetic ferrite as long as the soft magnetic member 26 has a conductivity. Here, it is possible to use a thermoplastic plastic member which has a desirable formability or a thermosetting plastic which has a desirable heat resistance for a plastic in a composite. Also, a powder for the soft magnetic metal member includes an atomized powder such as a carbonyl iron powder and an iron-Permalloy, and a reduced iron powder etc. On the other hand, for such a flake for the soft magnetic metal member, it is acceptable if an amorphous alloy flake be used which is formed by crushing a soft magnetic metal powder which is obtained by an atomizing method by using a crushing device or a ball-end mill and colliding a powder and a melt alloy grain which are mechanically flattened onto a surface of a copper which is cooled by a water.

Also, in a case in which a plurality of flakes which are made of a soft magnetic metal member or a soft magnetic ferrite are used, it is acceptable if the soft magnetic member 26 may be formed by a bonded sheet which is made by bonding the flakes on a surface of a base sheet which is made of a plastic closely. Also, it is acceptable if the soft magnetic member 26 is formed by disposing a plurality of flakes closely which are made of a soft magnetic metal member or a soft magnetic ferrite on a surface of a base sheet which is made of a plastic and covering it by a cover sheet which is made of a plastic so as to form a layered sheet in which a base sheet and the cover sheet are bonded.

Furthermore, in a case in which a composite member is used for the soft magnetic member 26, it is possible to form the soft magnetic member 26 by performing the injection molding operation or a compressing molding operation. Such a soft magnetic member 26 which is formed in this way is rigid with compared with a member which is formed by a fragile ferrite; thus, it is difficult to be broken. Also, a powder or a flake of the soft magnetic metal member or a soft magnetic ferrite are dispersed in a plastic or a rubber, thus, the powder or a fake are insulated from each other. Therefore, an entire soft magnetic member 26 does not have a conductivity such that an eddy current is not generated if a high frequency radio wave is received.

On the other hand, in a case in which the soft magnetic member 26 is formed by a composite member, it is preferable that the thickness of the powder or the flake should by 20 μm or thinner so as to avoid generating the eddy current in the powder or the flake in the soft magnetic metal member or the soft magnetic ferrite. Also, for a plastic, it is preferable to use a resin such as an acrylic member, a polyester, a polyvinyl chloride, a polyethylene, a polystyrene, and an epoxy. Here, the thickness of the soft magnetic member 26 is not limited particularly as long as there is shown an electromagnetic blocking effect. From an operable use point of view, it is preferable in a range of 5 μm to 500 μm.

In the transponder antenna 24 which is formed in this way, the coil main body 314*b* is blocked from the conductive member 314*a* electromagnetically by the soft magnetic member 26; thus, the Q value in the coil main body 314*b* is improved. Therefore, it is possible to adjust the turning number or the turning diameter of the coil main body 314*b* relatively easy so as to obtain a predetermined characteristic value. Also, it is possible to obtain a predetermined characteristic value reliably even if the transponder antenna 24 is attached to a surface of a metal article. As a result, a space which has been necessary for attaching the transponder antenna 24 to the metal product is not necessary; thus, the tag 12 is prevented from being protruded from an article which is an object to be controlled. Thus, it is possible to activate the tag 12 reliably without receiving an influence from a metal article.

Figure 20:
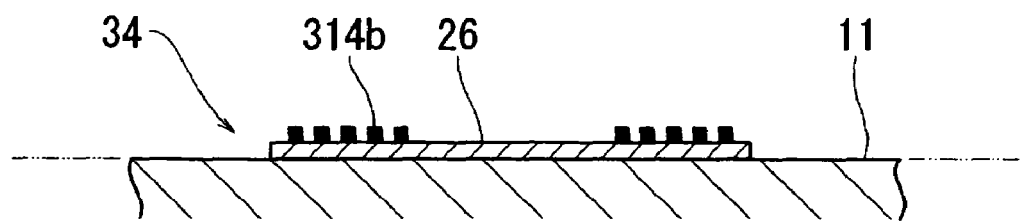
FIG. 20 is a cross section which corresponds to FIG. 16 which shows an antenna according to a ninth embodiment in which the soft magnetic member is attached to an article.

FIG. 20 shows a third embodiment of the present invention. The same reference numeral in FIG. 20 shows a member which has the same reference as those in FIGS. 15 to 19.

A transponder antenna 34 in the present embodiment comprises a soft magnetic member 26 which is formed in a plate manner such that a back surface of the soft magnetic member 26 is attached to an article and a coil main body 314*b* in which the turning number and the turning diameter are adjusted so as to be opened on a surface of the soft magnetic member 26 so as to be wound helically and fixed so as to obtain a predetermined characteristic value. The detail of the coil main body 314*b* is the same as that in the above first embodiment. The soft magnetic member 26 is the same as that in the above second embodiment. The transponder antenna which is formed in this way is effective for a case in which it is possible to obtain a predetermined characteristic value only by blocking the soft magnetic member 26 electromagnetically.

In the transponder antenna 34, a predetermined characteristic value can be obtained reliably by an electromagnetic blocking operation of the soft magnetic member 26 even if the antenna 34 is attached on a surface of a metal article. Thus, it is possible to activate the tag 12 reliably by transmitting a predetermined frequency of radio wave from a transmitting/receiving antenna in an interrogator which is not shown in the drawing to the antenna 34. Therefore, a space which has been necessary for attaching the antenna 34 onto a metal product conventionally is not necessary. Thus, the tag 12 is prevented from being protruded from an article which is an object to be controlled. Thus, it is possible to activate the tag 12 reliably without receiving an influence from a metal article.

Figure 21:
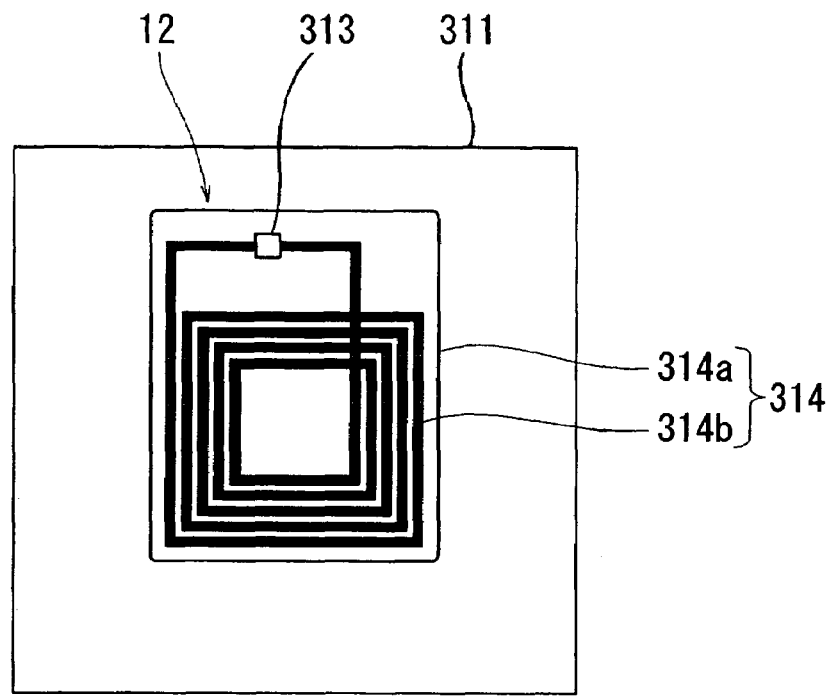
FIG. 21 is a plan view which corresponds to FIG. 15 which shows a case in which a coil main body has a rectangular shape.

Here, in the above explained seventh embodiment to the ninth embodiment, the coil main body 314*b* is formed in an approximate circular helical shape. However, it is acceptable if the coil main body 314*b* is formed in an approximate oval helical shape, or an approximate helical square shape shown in FIG. 21, or other helical shape.

Also, in the above explained seventh embodiment to the ninth embodiment, an RFID tag is named for the transponder. However, it is acceptable if the transponder antenna of the present invention is used for an EAS tag, a reader/writer, or other transponder.

Next, examples of the present invention are explained in detail together with comparative examples.

EXAMPLE 8

As shown in FIGS. 15 and 16, a coil main body which has 50 mm of outer diameter and 49 mm of inner diameter is produced by winding a coated copper wire which has 0.2 mm of diameter for 4 to 5 times. On the other hand, a soft steel plate which as a dimension of 100 mm×100 mm and 0.16 mm thickness and a non-metal acrylic plate which has the same shape and the same size as the soft steel plate for a purpose of comparison are prepared. Aluminum plates which have a dimension of 50 mm×50 mm and 0.2 mm thickness as a conductive member are disposed on a surface of the soft steel plate and on a surface of the acrylic plate respectively. The L1 value and the Q1 value for the coil main body are measured under condition that the coil main body is disposed on the aluminum plate which is disposed on the soft steel plate directly or with a predetermined interval. After that, the L2 value and the Q2 value for the coil main body are measured under condition that the coil main body is disposed on the acrylic plate which is disposed on the soft steel plate directly or with a predetermined interval. Consequently, L1/L2 is calculated.

EXAMPLE 9

A soft magnetic member is disposed between the coil main body and an aluminum plate in the example 8. For the soft magnetic member, a composite member which is formed by 72 weight % of a carbonyl iron and a polyethylene is injected into a mold and further compressed having 60 mm of outer diameter and 0.34 mm thickness is used. A coil main body in the example 8 is contacted on a surface of the soft magnetic member 26. Consequently, the L1 value and the Q1 value of the coil main body is measured under condition that a back surface of the soft magnetic member 26 contacts directly or with a predetermined interval on a surface of the aluminum plate which is disposed on a soft steel plate in the embodiment 8. In addition, the L2 value and the Q2 value of the coil main body is measured under condition that a back surface of the soft magnetic member 26 contacts directly or with a predetermined interval on a surface of the aluminum plate which is disposed on an acrylic plate in the embodiment 8. Thus, L1/L2 is calculated.

EXAMPLE 10

The L1 value and the Q1 value of the coil main body is measured under the same condition as the example 8 except that an aluminum plate which has 100 μm thickness is used instead of the aluminum plate of the example 8. The L2 value and the Q2 value of the coil main body are measured; thus, L1/L2 is measured.

EXAMPLE 11

The L1 value and the Q1 value of the coil main body is measured under the same condition as the example 9 except that an aluminum plate which has 10 µm thickness is used instead of the aluminum plate of the example 8. The L2 value and the Q2 value of the coil main body are measured; thus, L1/L2 is measured.

COMPARATIVE EXAMPLE 4

The L1 value and the Q1 value of the coil main body is measured under condition that a coil main body is disposed on a surface of a soft steel plate as an article in the example 8 directly or with a predetermined interval. Also, the L2 value and the Q2 value of the coil main body is measured under condition that a coil main body is disposed on a surface of an acrylic plate directly or with a predetermined interval. Thus, L1/L2 is calculated.

The result for them are shown in TABLE 4.

TABLE 4

| | | Acrylic Plate | | Soft Steel Plate | | |
|---|---|---|---|---|---|---|
| | Article | L2 (µH) | Q2 | L1 (µH) | Q1 | L1/L2 |
| Example 8 | Interval between Aluminum plate and coil main body | 0 | 0.667 | 15.5 | 0.677 | 15.2 | 99 |
| | | 0.607 | 1.163 | 25.1 | 1.204 | 31.7 | 97 |
| | | 1.214 | 1.482 | 45.5 | 1.511 | 34.4 | 98 |
| | | 1.821 | 1.694 | 52.7 | 1.702 | 49.4 | 100 |
| | | 2.428 | 1.892 | 57.2 | 1.862 | 54.9 | 102 |
| Example 9 | Interval between Aluminum plate and soft magnetic member | 0 | 1.804 | 40.0 | 1.775 | 38.5 | 102 |
| | | 0.607 | 2.019 | 43.9 | 2.021 | 42.2 | 100 |
| | | 1.214 | 2.187 | 46.9 | 2.182 | 44.6 | 100 |
| | | 1.821 | 2.238 | 47.8 | 2.330 | 47.0 | 100 |
| | | 2.428 | | | | | |
| Example 10 | Interval between Aluminum film and coil main body | 0 | 0.541 | 8.5 | 0.567 | 8.8 | 95 |
| | | 0.607 | 1.187 | 27.7 | 1.172 | 27.5 | 101 |
| | | 1.214 | 1.547 | 39.1 | 1.499 | 37.3 | 103 |
| | | 1.821 | 1.763 | 45.3 | 1.749 | 45.0 | 101 |
| | | 2.428 | 1.905 | 48.5 | 1.879 | 47.8 | 101 |
| Example 11 | Interval between Aluminum film and soft magnetic member | 0 | 1.855 | 33.1 | 1.969 | 22.0 | 94 |
| | | 0.607 | 2.129 | 36.4 | 2.146 | 36.6 | 99 |
| | | 1.214 | 2.281 | 38.2 | 2.329 | 37.9 | 98 |
| | | 1.821 | 2.456 | 39.2 | 2.507 | 39.1 | 98 |
| | | 2.428 | 2.586 | 39.3 | 2.549 | 39.5 | 101 |
| Comparative Example 4 | Inverval between Metal Plate etc. and coil main body | 0 | 2.968 | 77.2 | 1.213 | 6.8 | 245 |
| | | 0.607 | 2.968 | 77.2 | 1.359 | 9.3 | 218 |
| | | 1.214 | 2.968 | 77.2 | 1.612 | 14.5 | 184 |
| | | 1.821 | 2.968 | 77.2 | 1.801 | 19.3 | 165 |
| | | 2.428 | 2.968 | 77.2 | 1.963 | 24.1 | 151 |

As clearly understood from the TABLE 4, the L1/L2 value is large in the comparative example 4. If the coil main body is disposed on the metal article directly, a variance ratio is large. It is understood that it is not possible to activate the transponder if it is used in the transponder actually. Consequently, as an interval to the metal member becomes larger, the variance ratio decreases. A fact is disclosed that it is not possible to activate the transponder in a conventional antenna which comprises only the coil main body unless the antenna is attached to a metal surface via a spacer which has a predetermined thickness.

On the other hand, in the Example 8 and Example 10 in which an aluminum plate or an aluminum film are disposed between a metal plate and the coil main body, it is understood that the L1/L2 which indicates a variance of the L decreases greatly. Therefore, it is understood that the present invention can be realized because even if a transponder antenna to which a coil main body is fixed of which turning number and the turning diameter are adjusted so as to obtain the predetermined characteristic value under condition that it is wound around a surface of the conductive member is attached to a metal article directly, it is possible to estimate a function for an antenna can be realized.

Also, in the Example 9 and the Example 11 in which a soft magnetic member is disposed further between an aluminum plate or an aluminum film and the coil main body, it is understood that the L1/L2 value decreases greatly with compared to the comparative example 4, and the Q value is improved with compared to the Example 8 and the Example 10. The higher the Q value is, the less there is a loss by an eddy current etc. Thus, a characteristics for the transponder antenna is improved. Therefore, it is understood that a function for the antenna is improved sufficiently in the present invention in which a soft magnetic member is disposed between the conductive member and the coil main body.

Next, an example for showing whether or not the transponder in which an antenna of the present invention is used is actually operable is explained together with a comparative examples.

EXAMPLE 12

As shown in FIGS. 15 and 16, a coil main body which has 50 mm of outer diameter and 49 mm of inner diameter is produced by winding a coated copper wire which has 0.2 mm of diameter for 4 to 5 times. An aluminum film which has a dimension of 60 mm×60 mm and 10 µm thickness is prepared as a conductive member. The coil main body is fixed on a surface of the aluminum film directly, and an IC chip is connected to the coil main body electrically. Thus, a RFID tag which is a transponder is obtained. An example 12 is such a transponder.

EXAMPLE 13

A coil main body which is the same as that in the example 5 is produced by the same process as that in the example 12. Also, an aluminum film which has the same shape and the same size as that in the example 12 and an acrylic plate which has the same thickness 0.607 mm and the same outer shape as that of the aluminum film are prepared. The coil main body is fixed on a surface of the aluminum film via the acrylic plate, an IC chip is electrically connected to the coil main body. Thus, an RFID tag which is a transponder is obtained. An Example 13 is a transponder in which an aluminum film and the coil main body are fixed together so as to have an interval 0.607 mm.

EXAMPLE 14

A coil main body which is the same as that in the example 12 is produced by the same process as that in the example 12. Also, an aluminum film which has the same shape and the same size as that in the example 12. A circular hole of 40 mm diameter is opened in a center of the aluminum film. The coil main body is fixed on a surface of the aluminum film so as to surround the circular hole. An RFID tag which is a transponder is obtained by connecting the IC chip to the coil main body electrically. An Example 14 is a transponder in which the coil main body is fixed on the aluminum film in which a circular hole is formed.

EXAMPLE 15

A coil main body which is the same as that in the example 12 is produced by the same process as that in the example 12. Also, an aluminum film as a conductive member which has the same shape and the same size as that in the example 12 and a composite member which includes a carbonyl iron which has a dimension of 0.34 mm thickness and outer shape of 60 mm×60 mm as a soft magnetic member are prepared. The coil member is fixed on a surface of the aluminum film via the composite member. The IC chip is connected to the coil main body electrically; thus, an RFID tag which is a transponder is obtained. An example 15 is a transponder a soft magnetic member which is formed in a plate manner is disposed between the conductive member and the coil main body in this way.

EXAMPLE 16

A coil main body which is the same as that in the example 5 is produced by the same process as that in the example 12. Also, an aluminum film which has the same shape and the same size as that in the example 12 is prepared. A paint which includes a flake magnetic powder is applied on an aluminum film and dried: thus, a coating as a soft magnetic member with 0.2 mm thickness is formed on a surface of the aluminum film. The coil main body is fixed to a surface of the coating. An IC chip is connected to the coil main body electrically; thus, an RFID tag which is a transponder is obtained. An example 16 is a transponder in which a coating as a soft magnetic member is disposed between the conductive member and the coil main body in this way.

EXAMPLE 17

A coil main body which is the same as that in the example 12 is produced by the same process as that in the example 12. Also, a composite member which includes a carbonyl iron which has a dimension of 0.34 mm thickness and 60 mm×60 mm outer shape is prepared as a soft magnetic member. A paint which includes a silver powder is applied on a back surface of the composite member and dried; thus, a coating which has 0.15 mm thickness is formed on a back surface of the composite member. Consequently, a coil main body is fixed on a surface of the composite member. An IC chip is connected to the coil main body electrically; thus, an RFID tag which is a transponder is obtained. An example 17 is a transponder in which a composite member as a soft magnetic member is disposed between the coating as a conductive member and the coil main body in this way.

EXAMPLE 18

A coil main body which is the same as that in the example 12 is produced by the same process as that in the example 12. Also, a coating as a conductive member which has 0.15 mm thickness is formed on a back surface of the composite member in the same process as that in the example 10. The coating is removed from the composite member. The coil main body is fixed on a surface of the coating as a conductive member. An IC chip is connected to the coil main body electrically; thus, an RFID tag which is a transponder is obtained. An example 18 is a transponder which is provided with a coating as a conductive member.

EXAMPLE 19

A coil main body which is the same as that in the example 12 is produced by the same process as that in the example 12. A circular ferrite plate which has a dimension of 1 mm thickness and 60 mm diameter is prepared as a conductive member. The coil main body is fixed on a surface of the ferrite plate directly. An IC chip is connected to the coil main body electrically; thus, an RFID tag which is a transponder is obtained. An example 19 is such a transponder.

COMPARATIVE EXAMPLE 4

A coil main body which is the same as that in the example 12 is produced by the same process as that in the example 12. An IC chip is connected to the coil main body electrically; thus, an RFID tag which is a transponder is obtained. A comparative example 4 is a transponder which comprises a coil main body and an IC chip in this way.

COMPARATIVE EXAMPLE 5

A coil main body is produced by winding a coated copper wire which has 0.2 mm diameter by ten times around a composite member which includes a carbonyl iron which has a dimension of 1 mm thickness and an outer shape of 40 mm×40 mm. An IC chip is connected to the coil main body electrically; thus, an RFID tag which is a transponder is obtained. A comparative example 5 is a transponder which comprises a coil main body according to a spooling method and an IC chip.

<Comparison Test and Evaluation>

Thickness of the transponders in the examples 12 to 18 are measured and thickness of the transponders in the comparative examples 4 and 5 are measured respectively. These transponders are disposed on acrylic plates. L3 value and Q3 value are measured in the coil main body. Consequently, a transmitting/receiving antenna 21a in an interrogator which is shown in FIG. 22 is accessed by 30 mm; thus, it is confirmed whether or not it is operable properly.

Figure 22:
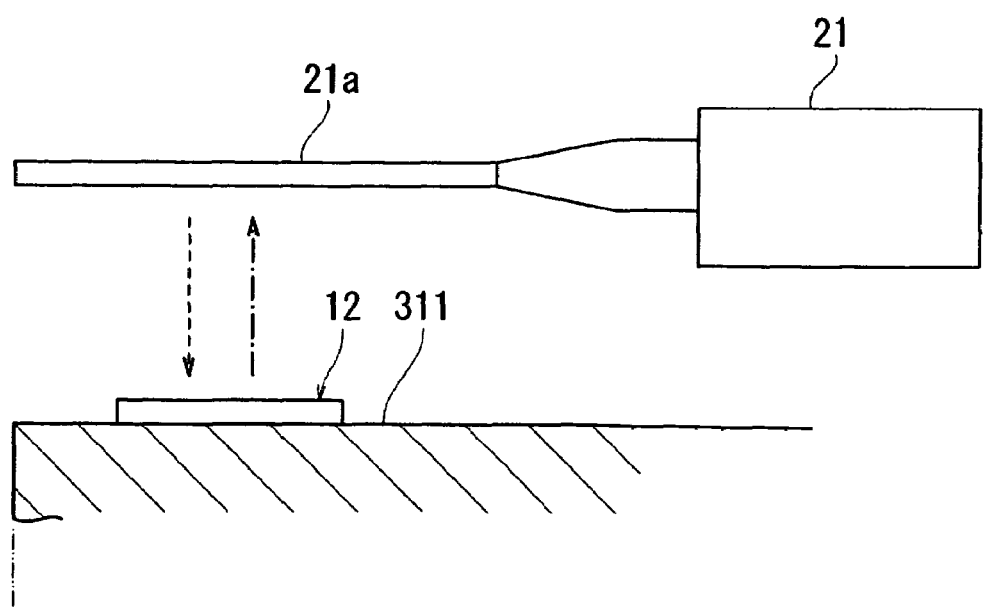
FIG. 22 is a view showing a condition for confirming operations in a transponder in the embodiments.

After that, tags 12 which are shown in FIG. 22 are disposed on steel plates as an article 311 which has 1 mm thickness. L4 value and Q4 value are measured in the coil main body. Consequently, a transmitting/receiving antenna 21a in an interrogator is accessed to these tags 12 under such conditions by 30 mm; thus, it is confirmed whether or not it is operable properly.

The L3 value, L4 value in the coil main body, measurement result in the Q3 value and the Q4 value, and a result of confirmation of operability are shown in a TABLE 5.

TABLE 5

| | Structure of Transponder | Thickness (mm) | Upper Stage L3(μH) Lower Stage L4(μH) | Upper Stage Q3 Lower Stage Q4 | Operability |
|---|---|---|---|---|---|
| Example 12 | Aluminum Film | 0.45 | 0.541<br>0.567 | 8.5<br>8.8 | Operable<br>Operable |
| Example 13 | Interval to Aluminum Film | 1.06 | 1.187<br>1.172 | 27.7<br>27.5 | Operable<br>Operable |
| Example 14 | Aluminum Film with Circular Hole | 0.45 | 1.127<br>1.067 | 27.0<br>13.8 | Operable<br>Operable |

TABLE 5-continued

| Structure of Transponder | | Thickness (mm) | Upper Stage L3(μH) Lower Stage L4(μH) | Upper Stage Q3 Lower Stage Q4 | Operability |
|---|---|---|---|---|---|
| Example 15 | Composite Member and Aluminum Film | 0.85 | 1.855<br>1.969 | 33.1<br>22.0 | Operable<br>Operable |
| Example 16 | Magnetic Coating and Aluminum Film | 0.7 | 1.754<br>1.844 | 36.7<br>36.8 | Operable<br>Operable |
| Example 17 | Composite Member and Conductive Coating | 0.8 | 1.790<br>1.8207 | 36.8<br>36.9 | Operable<br>Operable |
| Example 18 | Conductive Coating | 0.5 | 0.808<br>0.781 | 11.4<br>12.8 | Operable<br>Operable |
| Example 19 | Ferrite Plate | 1.5 | 4.611<br>4.261 | 60.3<br>38.9 | Operable<br>Operable |
| Comparative Example 4 | Only Coil | 0.4 | 2.968<br>1.213 | 77.2<br>6.8 | Operable<br>Not Operable |
| Comparative Example 5 | Spool mehtod Coil | 2 | 4.356<br>4.449 | 88.4<br>60.4 | Operable<br>Not Operable |

As understood from the TABLE 5, it is understood that variance in both L and Q is large in a case in which a transponder is disposed on a metal member in the comparative example 5; thus, the transponder which is disposed on the metal member is not operable properly. Also, in the comparative example 5, the variance in both L and Q in a case in which the transponder is disposed on a metal member is smaller as compared to the comparative example 2. However, the transponder which is disposed on the metal member is not operable properly. This is estimated that it is caused by a fact that a radio wave which is transmitted from a transmitting/receiving antenna in an interrogator which is accessed in a direction which is orthogonal to the metal surface as an article cannot be transmitted because a direction of a magnetic flux in a so-called spool method coil is an axial core direction of the coil.

On the other hand, in the examples 12 to 16 which have a conductive member which is formed by an aluminum film, and in the examples 17 and 18 which has a conductive member which is formed by a conductive coating, both the L value and Q value are relatively small. However, their variances are small; thus, it is understood that the transponder in a case in which it is disposed on a metal member is operable properly. Consequently, with compared to the embodiment 12 in which a coil body is fixed on an aluminum film directly, it is understood that both the L value and the Q value are improved in the example 13 in which an interval is disposed and the example 14 in which a circular hole is formed on an aluminum film. In addition, it is understood that both the L value and the Q value are improved in the examples 15 to 17 in which a soft magnetic member is disposed between the conductive member and the coil main body. Therefore, it is understood that the function for the antenna can be improved sufficiently in the present invention in which a soft magnetic member is disposed between the conductive member and the coil main body.

Also, it is understood that both the L value and Q value are improved further in the example 19 in which the coil main body is fixed on a surface of a ferrite plate which is a soft magnetic member; thus, a transponder it self is operable properly. Therefore, it is understood that a predetermined characteristic value can be obtained reliably and operable properly even if the transponder is attached on a surface of a metal article as long as the predetermined characteristic value can be obtained only by blocking the magnetic force from the soft magnetic member.

INDUSTRIAL APPLICABILITY

As explained above, according to the present invention, a magnetic core member which is inserted into an air-core coil is formed by a composite member which is rigid with compared to a magnetic core member which is formed by a fragile ferrite sintered member such that the magnetic core member is approximately parallel with a plane in an air-core coil which is wound helically in a plane. Therefore, it is possible to enhance the rigidity of an antenna coil. Also, a composite member which forms the magnetic core member is dispersed in a soft magnetic metal member, or a plastic or a rubber in which a powder or a flake of amorphous or a ferrite. The powder or a flake are insulated mutually, an entire magnetic core member does not have a conductivity. Therefore, an eddy current is not generated even if it receives a high frequency radio wave. Therefore, it never occurs that the Q value decreases due to the generation of the eddy current even though the radio wave has a relatively high frequency. Thus, it is possible to obtain an antenna coil which can be used sufficiently in a relatively high frequency.

Also, it is possible to form a magnetic core member relatively thinly by forming the magnetic core member by performing an injection molding operation, a compressing molding operation, or post-flattening molding operation for the composite member. It is possible to obtain a magnetic core member which has 0.8 mm or thinner thickness which has been difficult to form in an injection molding operation or compressing molding operation if a magnetic coating which is formed by applying and drying a composite member as a magnetic core member is used. As a result, it is possible to restrict a protruding amount of the antenna coil from the article greatly if it is attached to an article.

Furthermore, if a non-magnetic conductive plate which has a conductivity is layered on a surface of an air-core coil in which a magnetic core member is inserted, the conductive plate block the radio wave toward the article. Therefore, a space which is supposed to be inserted between an antenna coil and an article is not necessary. Thus, it is possible to operate the antenna coil reliably under condition that a protruding amount of the antenna coil from an article which is an object to be controlled is reduced than a conventional case.

In addition, the present invention comprises an insulating member, continuous conductive members in which forwarding sections and returning sections are formed alternatively so as to wind on a surface of the insulating member, and a first magnetic core member which is bonded on a back surface of the insulating member. Therefore, a magnetic flux which is generated by an electric current which passes the conductive member is parallel with a surface of an article on which an antenna coil is attached after passing the first magnetic core member. Also, the first magnetic core member is bonded on a back surface of the insulating member so as to cover the returning sections from a back surface of the insulating member without overlapping the forwarding section. A part of the magnetic flux which passes through the first magnetic core member is dispersed in its end section so as to pass above the forwarding sections and return to the neighboring first magnetic core member again. Thus, it is possible to operate reliably without receiving an influence even if a surface of an article is a metal member.

Also, if the second magnetic core member is bonded on a surface of the insulating member so as to cover the forwarding sections and overlap an end section of the first magnetic core member to which the end section neighbors without overlapping the returning sections, the magnetic flux passes through the first magnetic core member and the second magnetic core member while moving between the first magnetic core member and the second magnetic core member alternatively. Therefore, the forwarding sections and the returning sections exist on a top surface and a back surface of the magnetic flux alternatively; thus, the continuous conductive member which includes the forwarding sections and the returning sections is formed unitarily with the antenna coil which is wound around the magnetic flux. Thus, it is possible to obtain an antenna coil relatively easily which has the same characteristics as those in a conventional antenna coil which has been produced by winding a lead wire around an outer surface of the magnetic core member. Thus, it is possible to improve the productivity in a mass production. Furthermore, if a continuous conductive member is formed by a plurality of lead wires which are formed so as to wind on a surface of the insulating member with a predetermined interval along with each other, it is possible to increase so called a turning number easily by increasing the quantity of the forwarding sections and the returning sections which exist on a top surface and a back surface of the magnetic flux. By increasing the turning number, it is possible to improve the characteristics of the antenna coil.

Furthermore, if it is formed by performing an etching operation, a punching operation, a screen printing operation, or a vapor deposition operation of the conductive member, it is possible to form a conductive member on an insulating member relatively easily. If the first magnetic core member or the second magnetic core member is a soft magnetic metal member, a composite member of a powder or a flake and a plastic which are made of an amorphous or a ferrite, a plate or a film of a soft magnetic metal member, an amorphous film or its layered member, or a ferrite, the magnetic core member is relatively thin. Thus, it is possible to form an entire thickness of the antenna coil thinly. In particular, by forming a magnetic core member by a magnetic coating, it is possible to form the magnetic core member further thinly; thus, it is possible to obtain a further thin antenna coil by a magnetic core member which has 0.8 mm thickness which has been difficult in an injection molding operation.

Furthermore, the present invention comprises a coil main body which is made of a conductive member which is wound helically in a plane and a magnetic core member in a plate manner or a sheet manner which is bonded on a surface of the coil main body such that an end section is positioned in a central part which is surrounded by the coil main body so as to cross a part of the coil main body and the other end is positioned outside the coil main body. Therefore, it is possible to enhance the Q value while maintaining such a thin thickness of the antenna coil. Also, the magnetic flux which is generated by an electric current which passes toward the coil main body which is formed by a conductive member passes through the magnetic core member such that its magnetic flux direction is parallel with a surface of an article. An eddy current which is generated in a metal on a surface of the article is restricted even if the tag antenna coil is attached on a surface which is formed by a metal of the article. Thus, it is possible to obtain an antenna coil which can be operated reliably even if it is contacted closely on the metal article.

Figure 23:
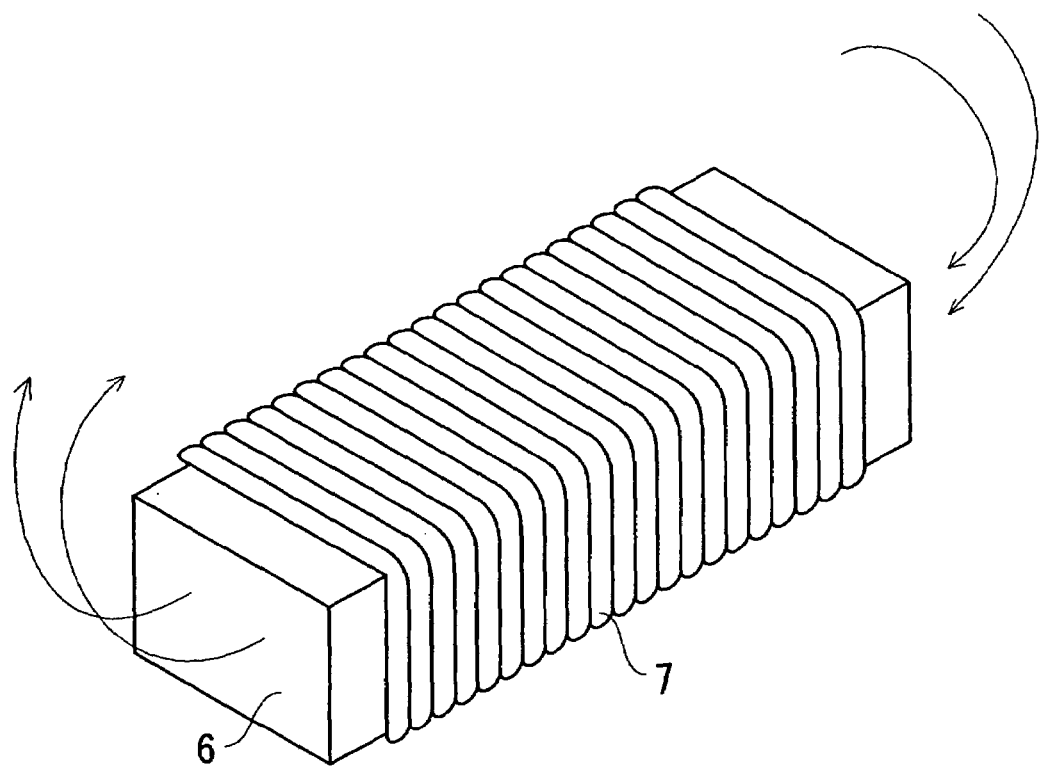
FIG. 23 is an isometric view for showing a conventional antenna coil which has a conductive member which is wound around an magnetic core member helically.

Also, a coil main body is formed by winding a conductive member 211 helically around a main surface of the electrically insulating film or a sheet, and a magnetic core member is layered on another main surface. By doing this, it is possible to obtain an antenna coil by relatively easy operation and improve the productivity in the mass production with compared to a conventional antenna coil shown in FIG. 23 which has been formed by winding a lead wire on an outer surface of the magnetic core member. Consequently, if a magnetic core member is formed by applying and drying an ink or a paint which include a magnetic powder on another main surface of an electrically insulating film or a sheet, it is possible to obtain a magnetic core member which has 0.8 mm thickness or thinner which has been difficult to form in an injection molding operation and a compressing molding operation and form the thickness of the antenna coil very thinly. Therefore, it is possible to restrict the protrusion of the antenna coil from the article greatly if it is attached to an article.

Furthermore, if the magnetic core member is disposed so as to be a near section for contacting the article, the magnetic flux which is generated by an electric current which passes toward the coil main body passes through mainly the magnetic core member; thus, few of the magnetic flux passes the article. Also, if a conductive member in a sheet manner or a plate manner is bonded on a surface of the coil main body so as to cover the magnetic core member, the conductive member is disposed between the coil main body which is formed by a conductive member and the article. Therefore, a radio wave is blocked toward the article by the conductive member. By doing this, if a surface of the article is formed by a metal, a loss is not generated by an eddy current etc. which is generated on a metal surface. As a result, it is possible to operate the antenna coil reliably.

In addition to the above explanations, the present invention comprises a conductive member which is formed in a plate manner such that a back surface of the conductive member is attached to an article and a coil main body of which turning number or a turning diameter is adjusted so as to obtain a predetermined characteristic value under condition that it is wound and fixed helically on a plane of the conductive member directly or with a predetermined interval. Therefore, it does not occur that the characteristic value of the coil main body varies greatly even if this antenna is attached to a metal article which is an object to be controlled. Thus, a space which has been necessary for attaching the antenna on a metal product conventionally is not necessary. Thus, it is possible to avoid the protrusion of the transponder from an article which is an object to be controlled greatly.

Also, if a soft magnetic member is disposed between a conductive member and the coil main body, the coil main body is blocked electromagnetically from the conductive member by the soft magnetic member; thus, the Q value of the coil main body improves. Therefore, it is possible to adjust the turning number and the turning diameter of the coil main body so as to obtain a predetermined characteristic value relatively easily. Also, it is possible to obtain a predetermined characteristic value even if this antenna is attached on a surface of an article which is made of a metal.

Furthermore, if a back surface of the soft magnetic member on an article and the coil main body which is wound helically is fixed on a surface of the soft magnetic member directly or with a predetermined interval, the radio wave toward the metal part is blocked by the soft magnetic member when a radio wave is transmitted under condition that an antenna is attached to an article which is made of a metal. Therefore, an eddy current is not generated in its metal part. As a result of this, a space which has been necessary is not necessary even if an article is made of a metal; thus, it is possible to prevent the antenna from contacting members therearound while being transported.

What is claimed is:

1. An antenna coil comprising:
   an air-core coil formed by a coil member wound on a plane; and
   a magnetic core member inserted in the air-core coil to be approximately parallel to the plane in the air-core coil
   wherein the magnetic core member is formed by a composite member including,
   a soft magnetic metal member,
   one of a powder of an amorphous member, and a powder of a ferrite member, and
   one of a plastic member and a rubber.

2. An antenna coil according to claim 1, wherein the magnetic core member is formed by at least one of the steps of:
   ejecting the composite member;
   compressing the composite member; and
   re-shaping a flat rolled composite member.

3. An antenna coil according to claim 1 wherein the magnetic core member is formed by a magnetic coating which is formed by drying the composite after applying the composite.

4. An antenna coil comprising:
   an air-core coil formed by a coil member wound on a plane; and
   a magnetic core member inserted in the air-core coil to be approximately parallel to the plane in the air-core coil,
   wherein a non-magnetic conductive plate is layered on a surface of the air-core coil through which the magnetic core member is inserted.

5. An antenna coil according to claim 4 wherein the conductive plate is formed by a copper, a copper alloy, an aluminum, or an aluminum alloy.

6. An antenna coil according to claim 5 wherein the conductive plate has 0.01 to 2 mm thickness.

7. An antenna coil comprising:
   an insulating member formed by an electrically insulating film or an electrically insulating sheet;
   a continuous conductive member including forwarding sections and returning sections formed alternatively to wind on a surface of the insulating member;
   a first magnetic core member bonded on a back surface of the insulating member to cover the returning sections from the back surface of the insulating member without overlapping the forwarding sections.

8. An antenna coil according to claim 7 wherein:
   a second magnetic core member covers the forwarding sections ot to overlap the returning sections on the surface of the insulating member such that an end section of the second magnetic core member is bonded to overlap an end section of the first neighboring magnetic member; and
   the second magnetic core member introduces a magnetic flux which passes through the first magnetic core member onto a surface of the insulating member on the forwarding sections.

9. An antenna coil according to claim 8 wherein:
   a plurality of conductive lines are disposed to wind on a surface of the insulating member in a predetermined interval along with each other in the continuous conductive member; and wherein
   an end section of the conductive line is connected to a starting end section of the neighboring conductive line.

10. An antenna coil according to claim 7 wherein:
    a plurality of conductive lines are disposed to wind on a surface of the insulating member in a predetermined interval along with each other in the continuous conductive member; and
    an end section of the conductive line is connected to a starting end section of the neighboring conductive line.

11. An antenna coil according to claim 7 wherein the continuous conductive member is formed on a surface of the insulating member by:
    etching a conductive film which is bonded on an entire surface of the insulating member in a predetermined pattern; or
    performing a screen printing operation or a vapor deposition operation of the conductive member on a surface of the insulating member in a predetermined pattern.

12. An antenna coil according to claim 7 wherein either one or both of the first magnetic core member or the magnetic core member is formed by a soft magnetic metal member, a powder or a flake which is formed by an amorphous member or a ferrite member, a plastic composite member, a plate or a film which is formed by a soft magnetic metal member, an amorphous film or its layered member, or a ferrite member.

13. An antenna coil according to claim 7 wherein either one or both of the first magnetic core member and the magnetic core member is formed by a magnetic coating which is formed by applying an ink or an applying member which include a magnetic powder onto the insulating member and drying the ink or the applying member.

14. An antenna coil according to claim 7 wherein a conductive member made of a sheet member or a plate member is bonded onto a back surface of the insulating member to cover the first magnetic core member.

15. A tag antenna coil comprising:
    a coil main body formed by a conductive coil member wound in a plane; and
    a magnetic core member made of a sheet member or a plate member bonded on a surface of the coil main body such that an end of the magnetic core member is disposed in a central section which is surrounded by the coil main body and another end of the magnetic core member is disposed at an outside of the coil main body to cross a part of the coil main body.

16. A tag antenna coil according to claim 15 wherein the coil main body is formed by punching a conductive plate or a conductive film.

17. A tag antenna coil according to claim 15 wherein the coil main body is formed by:
    etching a conductive film which is bonded on an entire main surface of an electrically insulating film or a sheet in a predetermined pattern; or
    performing a screen printing operation or a vapor deposition operation of the conductive member on an entire main surface of the electrically insulating film or the sheet in a predetermined pattern.

18. A tag antenna coil according to claim 17 wherein the magnetic core member is a magnetic coating which is formed by applying an ink or an applying member which include a magnetic powder onto another main surface of the electrically insulating film or a sheet and drying the ink or the applying member.

19. A tag antenna coil according to claim 15 wherein the magnetic core member is a magnetic coating which is formed by applying a soft magnetic metal member, a powder or a flake which is formed by an amorphous member or a ferrite member, a plastic composite member, a plate or a film which is formed by a soft magnetic metal member, an amorphous film or its layered member, or a ferrite member, or an ink or an applying member which include a magnetic powder onto an electrically insulating film or a sheet and drying the ink or the applying member.

20. A tag antenna coil according to claim 15 wherein a conductive member made of a sheet member or a plate member is bonded onto a surface of the coil main body to cover the magnetic core member.

21. An RFID tag comprising:
an antenna coil attached to an article according to claim 15; and
an IC chip connected to the antenna coil electrically such that a specific information for each article is stored in the IC chip, wherein
the antenna coil is attached to the article such that the magnetic core member is disposed between the article and the coil main body.

22. A transponder antenna connected to an IC chip or a condenser electrically to be attached to an article comprising:
a conductive member having a back surface attached to the article; and
a coil main body wound helically on a surface of the conductive member via an insulating member and fixed thereon such that a turning number and a coil diameter are adjusted to realize a predetermined characteristic value under a wound condition,
wherein an electric resistance for a portion of the conductive member having 1 cm width and 1 cm length is 5Ω or lower.

23. A transponder antenna according to claim 22 wherein the conductive member is a conductive member which is formed by connecting both ends of a sheet, a plate, a film or a coil.

24. A transponder antenna according to claim 22 wherein:
the insulating member is a non-conductive sheet, plate, or film;
the conductive member is a conductive coating which is formed by applying a conductive ink onto a back surface of the insulating member and drying the conductive ink; and
the coil main body is wound around a surface of the insulating member to be fixed therearound.

25. A transponder antenna according to claim 24 wherein an interval between the conductive member and the coil main body is 0.01 to 5 mm.

26. A transponder antenna according to claim 22 wherein:
the conductive member is formed by layering a conductive plating layer or vapor deposition layer on a back surface of the non-conductive sheet, plate, or a film; and
the coil main body is wound around a surface of the sheet, a plate, or a film so as to be fixed therearound.

27. A transponder antenna according to claim 22 wherein a hole is formed on a section which is surrounded by the coil main body of the conductive member.

28. A transponder antenna connected to an IC chip or a condenser electrically to be attached to an article comprising:
a conductive member having a back surface attached to the article; and
a coil main body wound helically on a surface of the conductive member via an insulating member and fixed thereon such that a turning number and a coil diameter are adjusted to realize a predetermined characteristic value under a wound condition,
wherein a soft magnetic member is disposed between the conductive member and the coil main body.

29. A transponder antenna according to claim 28 wherein a product of a transmission rate of the soft magnetic member and a thickness represented in a unit such as mm indicates 0.5 or larger.

30. A transponder antenna according to claim 28 wherein the soft magnetic member is formed by any one of members of an amorphous alloy, a Permalloy, a magnetic steel, a silicon steel, a sendust alloy, a quench solidified member for Fe—Al alloy or a soft magnetic ferrite, a casted member, a rolled strip member, a forged member, or a sintered member.

31. A transponder antenna according to claim 28, wherein the soft magnetic member is at least one of:
a composite member of at least one of soft magnetic metal powder, soft magnetic metal flake, soft magnetic ferrite powder, and soft magnetic ferrite flake, and at least one of a plastic member and rubber; and
a coating of an applying member including at least one of soft magnetic metal powder, soft magnetic metal flake, soft magnetic ferrite powder, and soft magnetic ferrite flake.

32. A transponder antenna according to claim 28 wherein the soft magnetic member is a sheet which is formed by bonding a plurality of flakes which are made of a soft magnetic metal member or a soft magnetic ferrite onto a surface of a plastic base sheet such that the flakes contact closely each other.

33. A transponder antenna according to claim 28 wherein the soft magnetic member is a sheet which is formed by:
bonding a plurality of flakes which are made of a soft magnetic metal member or a soft magnetic ferrite onto a surface of a plastic base sheet such that the flakes contact closely each other;
covering the flakes by a plastic cover sheet; and
attaching the base sheet and the cover sheet.

34. A transponder antenna attached to an article connected to an IC chip or a condenser electrically comprising:
a soft magnetic member formed in a sheet manner having a back surface directly attached on the article; and
a coil main body wound helically on a surface of the soft magnetic member to be fixed thereon such that a turning number and a coil diameter are adjusted to realize a predetermined characteristic value under a wound condition.

* * * * *